United States Patent [19]
Greggain et al.

[11] Patent Number: 5,991,463
[45] Date of Patent: Nov. 23, 1999

[54] SOURCE DATA INTERPOLATION METHOD AND APPARATUS

[75] Inventors: Lance Greggain, Woodbridge; Calvin Ngo, Thornhill, both of Canada

[73] Assignee: Genesis Microchip Inc., Mankham, Canada

[21] Appl. No.: 08/555,289

[22] Filed: Nov. 8, 1995

[51] Int. Cl.⁶ .............................. G06K 9/32; H04N 5/44; H04N 1/393; G06F 7/00

[52] U.S. Cl. ........................ 382/298; 382/293; 382/300; 348/561; 348/581; 348/582; 358/451; 364/715.07

[58] Field of Search .................................. 382/278, 298, 382/293, 288, 300; 348/348, 458, 699, 561, 581, 582, 704; 358/451; 364/715.07

[56] References Cited

U.S. PATENT DOCUMENTS

| | | | |
|---|---|---|---|
| 4,985,764 | 1/1991 | Sato | 348/448 |
| 5,274,372 | 12/1993 | Luthra et al. | 341/61 |
| 5,347,599 | 9/1994 | Yamashita et al. | 382/278 |
| 5,469,222 | 11/1995 | Sprague | 348/458 |
| 5,497,203 | 3/1996 | Kayashima et al. | 348/699 |
| 5,579,053 | 11/1996 | Pandel | 348/448 |

FOREIGN PATENT DOCUMENTS

| | | | |
|---|---|---|---|
| A2-0 571-026 | 11/1993 | European Pat. Off. | G06F 15/62 |
| 4407101 | 9/1995 | Germany . | |
| 0 550 231 A1 | 7/1993 | United Kingdom . | |
| 0 561 286 A1 | 9/1993 | United Kingdom . | |

OTHER PUBLICATIONS

Simonetti, et al "A Deinterlacer For IQTV Receivers and Multimedia Applications," IEEE, No. 3, Aug. 1993.

Simonetti R. et al., "A Deinterlacer For IQTV Receivers And Multimedia Applications", *IEEE Transactions on Consumer Electronics*, 39(1993) Aug., No. 3, New York, US, pp. 234–240.

Doyle T. et al., "Progressive Scan Conversion using Edge Information", *Signal Processing of HDTV, II*, Proceedings of the Third International Workshop on HDTV, Turin, Italy, Aug. 30th–Sep. 1, 1989, Chiariglione, L., pp. 711–721.

International Search Report, International Application No. PCT/CA 96/00703, filed Oct. 22, 1996.

*Primary Examiner*—Leo H. Boudreau
*Assistant Examiner*—Daniel G. Mariam
*Attorney, Agent, or Firm*—Staas & Halsey LLP

[57] ABSTRACT

A method of generating an upsampled target pixel positioned between two lines of input source data includes the step of comparing pixels of different lines of the source data in a region surrounding the upsampled target pixel to be generated in at least two different directions. An interpolation direction based on the comparison is selected and interpolations between selected pixels of the source data in the determined interpolation direction are carried out to compute intermediate pixels on a line segment passing through the upsampled target pixel. An interpolation between the intermediate pixels is carried out to generate the upsampled target pixel. An apparatus for performing the method is also disclosed.

45 Claims, 25 Drawing Sheets

SOURCE DATA INTERPOLATION METHOD AND APPARATUS

FIELD OF THE INVENTION

The present invention relates to data interpolation and in particular to a method of generating an upsampled target pixel from input source data and an apparatus for performing the method.

BACKGROUND OF THE INVENTION

Video images can be represented as a two-dimensional array of digital data with each data point in the array representing a pixel of the digitized video image. The value assigned to each pixel determines its intensity and/or colour when the video image is recreated. In the video imaging art, it is often desired to magnify a video image to arbitrary magnification factors to create enlarged video images. When creating an enlarged image from an original image represented by a digital data array, it is necessary to interpolate between pixels of the original digital data array to generate upsampled pixels between consecutive lines and pixels of the original digital data array to "fill" in pixels of the enlarged image. Prior art techniques to create these enlarged video images have been considered.

It is common practice in the prior art to use an orthogonal, Cartesian approach to interpolate separately the vertical and horizontal dimensions of the digitized video image to be enlarged. However, this technique typically results in enlarged video images which suffer from jagged edges commonly referred to as "stairstepping". Improvements in the interpolation method used may reduce the stairstepping, but it cannot be completely avoided because it is inherent when using this technique.

A directional interpolation scheme addresses the stairstepping problem. Directional interpolation recognizes the geometric structure in images. With directional interpolation, it has been found that interpolation along the edges produces improved results over interpolation across the edges. Directional interpolation involves analysing local image structure and performing the interpolation based on the image structure.

U.S. Pat. No. 5,019,903 to Dougall et al. discloses an apparatus for directional interpolating between lines of a supersampled digital signal. The apparatus calculates gradient vectors for use in directionally interpolating a vertically upsampled line. This operation makes the apparatus best suited for line-doubling deinterlacing applications.

U.S. Pat. No. 5,347,599 to Yamashita et al. discloses an adaptive interpolation method and an apparatus using correlation detection. The apparatus performs calculations on lines of pixels of the source data to select the desired upsampling direction. However, similar to Dougall et al, this apparatus is also best suited for line-doubling deinterlacing applications.

Although Dougall et al. and Yamashita et al. disclose alternative directional interpolation methods to generate upsampled pixels, their design is such as to support only fixed, integral vertical resize factors. Accordingly, there exists a need for an improved interpolation method and apparatus that supports arbitrary, fractional resize factors in both vertical and horizontal dimensions.

It is therefore an object of the present invention to provide a novel method and apparatus for generating an upsampled target pixel from input source data.

SUMMARY OF THE INVENTION

The present invention performs directional interpolation to arbitrary, fractional resize factors. First, an interpolation direction is selected corresponding to any low-frequency edges in the source data. Next, directional interpolation is performed to generate intermediate pixels. The intermediate pixels are then interpolated, possibly non-orthogonally, to generated the desired upsampled pixel.

More specifically, according to one aspect of the present invention there is provided a method of generating an upsampled target pixel from input source data comprising the steps of:

(i) comparing pixels of different lines of said source data in a region surrounding an upsampled target pixel to be generated in at least two different directions;

(ii) selecting an interpolation direction based on the comparisons of step (i);

(iii) interpolating between selected pixels of different lines of said source data in the interpolation direction determined at step (ii) and computing intermediate pixels on a line segment passing through said upsampled target pixel; and (iv) interpolating between the intermediate pixels to generate said upsampled target pixel.

In the preferred embodiment, the line segment is parallel to the lines of the source data. Restricting the line segment to be horizontal as such, greatly simplifies the calculation of the intermediate pixels and the upsampled target pixel.

In one possible embodiment pixels of the different lines of source data are compared in three different directions, including a vertical direction, and opposite oblique directions forming an angle with the vertical direction that is in the range 0<angle<90°. During the comparisons of step (i), difference values between the compared pixels are generated, the difference values being used to select the interpolation direction at step (ii).

In this embodiment, prior to step (ii), the difference values resulting from the comparisons in the three directions are compared to determine whether the differences therebetween are within a threshold. The direction associated with the smallest difference value is selected as the interpolation direction when none of the differences are within the threshold. When the differences between the difference values resulting from the comparisons in all three directions are within the threshold, the vertical direction is selected as the interpolation. When the difference between the difference values resulting from the comparisons in the vertical direction and only one of the oblique directions is within the threshold, that oblique interpolation direction is selected as the interpolation direction. When the difference between the difference values resulting from the comparisons in the two oblique directions is within the threshold, additional pixels of the different lines of source data are compared in the opposite oblique directions. The difference values generated as a result of these comparisons are compared. When the difference between the difference values resulting from the comparisons of the additional pixels is within the threshold, the vertical interpolation direction is selected as the interpolation direction.

In another embodiment the line segment is once again parallel to the lines of the source data but this time pixels of the different lines of source data are compared in seven directions at step (i). These directions include the vertical direction and three pairs of opposite oblique directions forming varying angles with the vertical direction that are within the range 0°<angle<90°. Difference values between the compared pixels of step (i) are calculated.

In this embodiment, the set of difference values to the left of the set under consideration and the set to the right are also examined. The three difference values for each possible oblique interpolation direction are summed and compared to determine if the differences therebetween are within a threshold. When none of the differences are sufficiently small to indicate a low-frequency edge in the source image, then the vertical direction is selected as the interpolation direction. When none of the differences are within the threshold, then the oblique direction associated with the smallest difference value is selected as the interpolation direction. When difference values associated with a "right-ward" oblique direction and a "left-ward" oblique direction are within the threshold, then the vertical direction is once again selected as the interpolation. Otherwise one of the oblique directions is selected as the interpolation direction.

According to another aspect of the present invention there is provided an apparatus for generating an upsampled target pixel from input source data comprising:

comparison means for comparing pixels of different lines of said source data in a region surrounding an upsampled target pixel to be generated, in at least two different directions;

selection means for selecting an interpolation direction in response to said comparison means; and upsampling means for interpolating between selected pixels of different lines of said source data in the interpolation direction selected by said selection means to compute intermediate pixels on a line segment passing through said upsampled target pixel and for interpolating between the intermediate pixels to generate said upsampled target pixel.

The present invention provides advantages in that upsampled target pixels can be generated to allow large magnified images to be created with reduced stairstepping, particularly in the case of large magnification factors.

BRIEF DESCRIPTION OF THE DRAWINGS

Embodiments of the present invention will now be described more fully with reference to the accompanying drawings in which.

DESCRIPTION OF THE PREFERRED EMBODIMENTS

When upsampling input video image digital source data to create an enlarged video image, it is necessary to generate upsampled target pixels between the lines and pixels of the digital source data. The resize factor and the resize direction (i.e. vertical and/or horizontal) determine the number as well as the position of the upsampled target pixels to be generated.

In order to reduce stairstepping and create enlarged video images of high resolution, it is necessary to calculate accurately the values for the various upsampled target pixels to be generated. Thus, the upsampling interpolation direction used to generate the values of the upsampled target pixels should be selected to achieve this goal. Failure to select an upsampling interpolation direction which results in accurate values for the upsampled target pixels will result in the generation of enlarged images with noticeable stairstepping.

The present method and apparatus generates an upsampled target pixel by calculating the difference in values of pixels of the digital source data in a region surrounding the upsampled target pixel to be generated in a number of directions. The calculated difference values are then examined in order to select an interpolation direction. Interpolatiens between selected pixels of the digital source data in the determined interpolation direction are then performed to generate intermediate pixels on a line segment that passes through the upsampled target pixel to be generated. Restricting the line segment to be parallel to the source data—that is, horizontal—simplifies the calculation of the intermediate pixels. Interpolations between the intermediate pixels are then performed to generate the upsampled target pixel.

An embodiment of the present method of generating an upsampled target pixel from input source data will now be described with particular reference to FIGS. 1 to 7b.

When an upsampled target pixel w is to be generated, the closest pixel to the upsampled target pixel in the digital source data is determined and is used as a reference pixel $P_R$ in the interpolation method. The two consecutive lines of source data between which the upsampled target pixel is located are also determined. The reference pixel, the adjacent pixel on the same line of source data as the reference pixel $P_r$ and the two pixels on the other line of source data that form a rectangular region R surrounding the upsampled target pixel are determined (see block 50 in FIG. 7a). The four source pixels that define the boundary of region R are used initially to determine the interpolation direction as will be described. The region R may correspond to any one of the four quadrants, namely top-left, top-right, bottom-left or bottom-right surrounding the reference pixel $P_R$.

Figure 1:
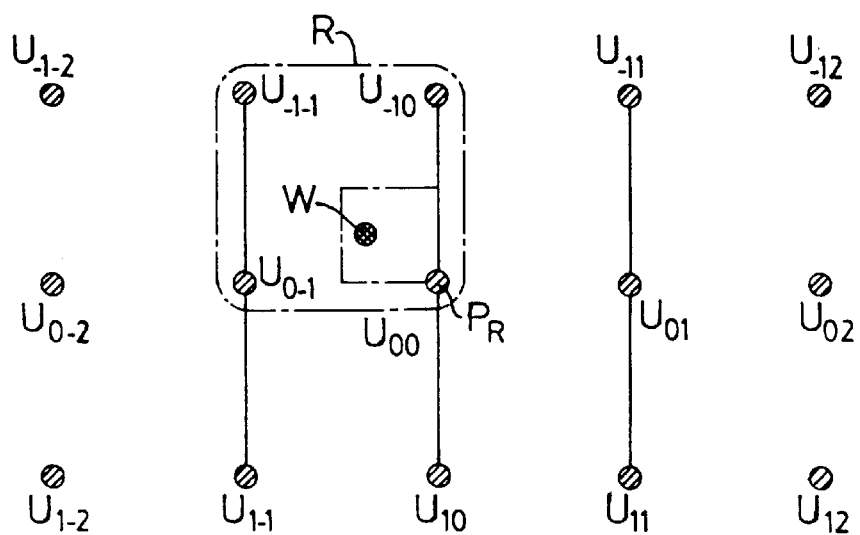
FIG. 1 is a diagram showing the pixels of three consecutive lines of video image source data, the position of an upsampled target pixel to be generated and the region surrounding pixels of the source data used to generate the upsampled target pixel.

FIG. 1 shows a small segment of digital source data. The source pixels are labelled relative to the reference pixel $P_r = U_{00}$. The first line of source data is represented by five pixels $U_{-1-2}$ to $U_{-12}$, the second line of source is represented by pixels $U_{0-2}$ to $U_{02}$ and the third line of source is represented by pixels $U_{1-2}$ to $U_{12}$. Clearly, pixel $U_{00}$ is the closest pixel to upsampled target pixel w and is the designated reference pixel $P_R$. In this example, the upsampled target pixel w is positioned between the first and second lines in the top-left quadrant of region R. Pixels $U_{-1-1}$, $U_{-10}$, $U_{0-1}$ and $U_{00}$ are the pixels that define the region R surrounding the upsampled target pixel w and are used in the interpolation direction making decision. The following chart shows the pixels of the source data that define the region R in the four quadrants surrounding the reference pixel:

| Quadrant | Pixels in Region R |
| --- | --- |
| Top-Left | $U_{00}$, $U_{0-1}$, $U_{-1-1}$, $U_{-10}$ |
| Top-Right | $U_{00}$, $U_{01}$, $U_{-11}$, $U_{-10}$ |
| Bottom-Left | $U_{00}$, $U_{0-1}$, $U_{1-1}$, $U_{10}$ |
| Bottom-Right | $U_{00}$, $U_{01}$, $U_{11}$, $U_{10}$ |

Once the four pixels of region R have been determined, calculations are performed corresponding to three interpolation directions (see block 52). In the example of FIG. 1, region R is defined by pixels: $U_{-1-1}$, $U_{-10}$, $U_{0-1}$ and $U_{00}$ and the following calculations are performed:

| Calculation | Associated Interpolation Direction | | |
| --- | --- | --- | --- |
| $abs[U_{00} - U_{-1-1}]$ | oblique 45° line up-left | $O_L$ | (1) |
| $abs[U_{0-1} - U_{-10}]$ | oblique 45° line up-right | $O_R$ | (2) |
| $abs[U_{00} - U_{-10}]$ | vertical | V | (3) |

Figure 2:
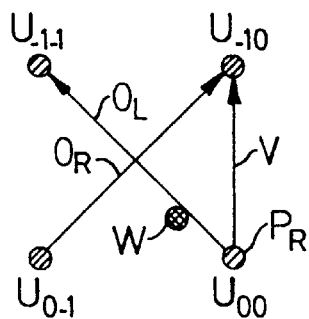
FIG. 2 is a diagram showing the comparisons that are made between pixels of the source data in order to determine the interpolation direction to be used when generating an upsampled target pixel.

FIG. 2 illustrates the interpolation directions $O_L$, $O_R$ and V associated with the three calculations performed on pixels $U_{-1-1}$, $U_{-10}$, $U_{0-1}$ and $U_{00}$. Similar calculations apply for the other three quadrants.

The calculation which yields the smallest difference value is usually associated with the interpolation direction which will yield an upsampled target pixel w having a value which is most similar to the values of the surrounding pixels of the source data. However before the interpolation direction is selected based on the results of these calculations, the calculated difference values are compared with each other to determine whether the differences are within a threshold of one another (see blocks 54 and 56).

If one of the calculated difference values is clearly smaller than the other two values, the interpolation direction associated with the smallest calculated value is selected (block 58). If all three calculated difference values are within the threshold, the vertical interpolation direction V is selected (blocks 66 and 68).

If the calculated difference value associated with the vertical interpolation direction V and the calculated difference value associated with only one of the oblique directions $O_L$ or $O_R$ are within the threshold of one another, the oblique interpolation direction is selected (blocks 70 and 72).

Figure 3:
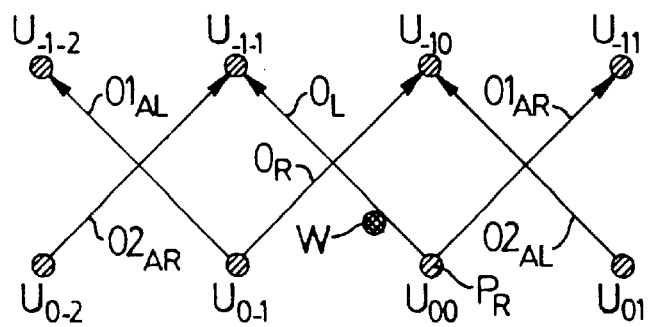
FIG. 3 is a diagram illustrating additional comparisons that are made between pixels of the source data when comparisons in two oblique directions yield similar values.

In the case where the calculated difference values associated with the two oblique interpolation directions $O_L$ and $O_R$ are within the threshold of one another, it is important to select the proper interpolation direction since an incorrect decision will yield an enlarged image with noticeable discontinuities in diagonal lines. To assist in the selection process, calculations using additional pixels from the same lines of source data are performed (block 74). FIG. 3 shows these additional calculations for the example of FIGS. 1 and 2:

| Calculation | Associated Interpolation Direction | | |
| --- | --- | --- | --- |
| $abs[U_{00} - U_{-11}]$ | oblique 45° up-right | $O1_{AR}$ | (4) |
| $abs[U_{0-1} - U_{-1-2}]$ | oblique 45° up-left | $O1_{AL}$ | (5) |

These additional calculated difference values are then compared to determine if they are within the threshold of one another (block 76). If one of these difference values is clearly smaller than the other, the oblique interpolation direction $O_L$ or $O_R$ associated with that calculated difference value is selected (block 58). However, if these two additional calculated difference values are within the threshold of one another, the additional following calculations using additional pixels from the same lines of source data are performed (block 78):

| Calculation | Associated Interpolation Direction | | |
| --- | --- | --- | --- |
| $abs[U_{0-2} - U_{-1-1}]$ | oblique 45° up-right | $O2_{AR}$ | (6) |
| $abs[U_{01} - U_{-10}]$ | oblique 45° up-left | $O2_{AL}$ | (7) |

Similarly, these additional calculated difference values are compared to determine if they are within the threshold of one another (block 80). If one of these difference values is clearly smaller than the other, the oblique interpolation direction $O_L$ or $O_R$ associated with that calculated difference value is selected (block 58). However, if these two additional calculated difference values are within the threshold of one another, the vertical interpolation direction V is selected as a default to avoid the resolution problems which would occur if the incorrect oblique interpolation direction was selected (block 82).

Once the interpolation direction is determined, selected pixels of the source data are determined based on the interpolation direction (block 60) and the interpolation direction is used to interpolate between the selected pixels of the source data to generate intermediate pixels v (block 62). The intermediate pixels are then interpolated horizontally to generate the upsampled target pixel w (block 64).

Before the upsampled target pixel w can be generated, the location of the upsampled target pixel w must be determined. The upsampled target pixel w is defined by its distances from the reference pixel $P_R$ both in the vertical and horizontal directions. These distances are represented by the terms $\alpha_y$ and $\alpha_x$ where:

$$-0.5 < \alpha_y \leq 0.5;$$

and $$-0.5 < \alpha_x \leq 0.5;$$

$\alpha_y$ being positive downward and $\alpha_x$ being positive to the right. The signs of $\alpha_y$ and $\alpha_x$ are related to the quadrant as follows:

| Quadrant | $\alpha_x$ | $\alpha_y$ |
| --- | --- | --- |
| Top-Left | $\alpha_x < 0$ | $\alpha_y < 0$ |
| Top-Right | $\alpha_x \geq 0$ | $\alpha_y < 0$ |
| Bottom-Left | $\alpha_x < 0$ | $\alpha_y \geq 0$ |
| Bottom-Right | $\alpha_x \geq 0$ | $\alpha_y \geq 0$ |

With the values of $\alpha_x$ and $\alpha_y$ known, interpolations are performed between the selected pixels of the source data in the determined interpolation direction. The resulting intermediate pixels v, are positioned on a horizontal line segment which passes through the upsampled target pixel w. In the present embodiment linear upsampling is described, however higher orders of interpolation can be used.

Figure 4:
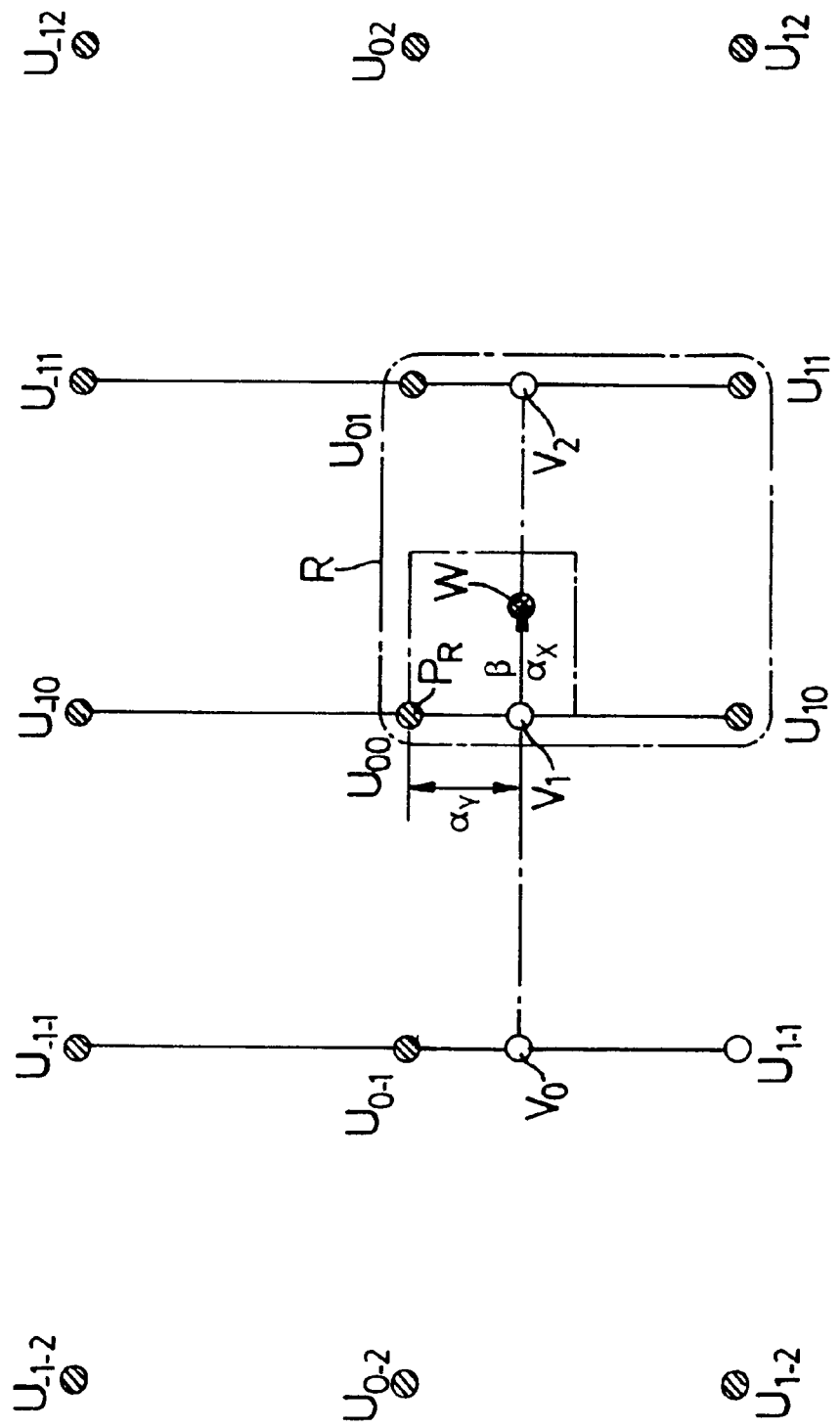
FIG. 4 is a diagram showing a vertical upsampling technique used to generate an upsampled target pixel.

FIG. 4 shows an upsampled target pixel w positioned in the bottom-right quadrant. In this case, both $\alpha_x$ and $\alpha_y$ are positive. The region R is defined by pixels $U_{00}, U_{01}, U_{10}$ and $U_{11}$ and pixel $U_{00}$ defines the reference pixel $P_R$. Intermediate pixels $v_0$, $v_1$ and $v_2$ are also shown and have been computed using linear upsampling in the vertical direction. The intermediate pixels $v_0$, $v_1$ and $v_2$ in this case are computed using the following equations:

$$v_0 = (1-\alpha_y)U_{0-1} + \alpha_y U_{1-1} \tag{8}$$

$$v_1 = (1-\alpha_y)U_{00} + \alpha_y U_{10} \tag{9}$$

$$V_2 = (1-\alpha_y)U_{01} + \alpha_y U_{11} \tag{10}$$

After the three upsampled intermediate pixels have been computed, interpolations are performed orthogonally horizontally between the two intermediate pixels on opposite sides of the upsampled target pixel w to determine the value of the upsampled target pixel. Therefore, before the upsampled target pixel w can be computed, it is necessary to determine which two intermediate pixels to select. In order to select the intermediate pixels, the term $\beta$ is defined as the horizontal distance from the middle intermediate pixel $v_1$ to the upsampled target pixel w. The term $\beta$ is positive to the right. For vertical interpolation, $\beta = \alpha_x$. The sign of $\beta$ determines which two intermediate pixels surround the target pixel w. In the example of FIG. 4, $\beta \geq 0$ so the interpolation is performed between $v_1$ and $v_2$. The value of the upsampled target pixel w is computed using the following equation:

$$w = (1-\alpha_x)v_1 + \alpha_x v_2 \tag{11}$$

In other quadrants, that is, cases for $\alpha_y$ and $\alpha_x$, the intermediate pixels v and the upsampled target pixel w are calculated in a similar manner using different pixels of the source data that surround the reference pixel $P_R$.

When the oblique up-left interpolation direction $O_L$ is selected, the intermediate pixels $v_0$, $v_1$ and $v_2$ are computed by interpolating linearly between selected pixels of the source data along negatively sloped diagonal lines. When linearly interpolating, the important parameter is the ratio of the distance of the interpolated pixel endpoints. Since the lines of source data and the horizontal line segment defined by the intermediate pixels are parallel, the intermediate pixels can be defined by $\alpha_y$, similar to the vertical upsampling case.

Figure 5:
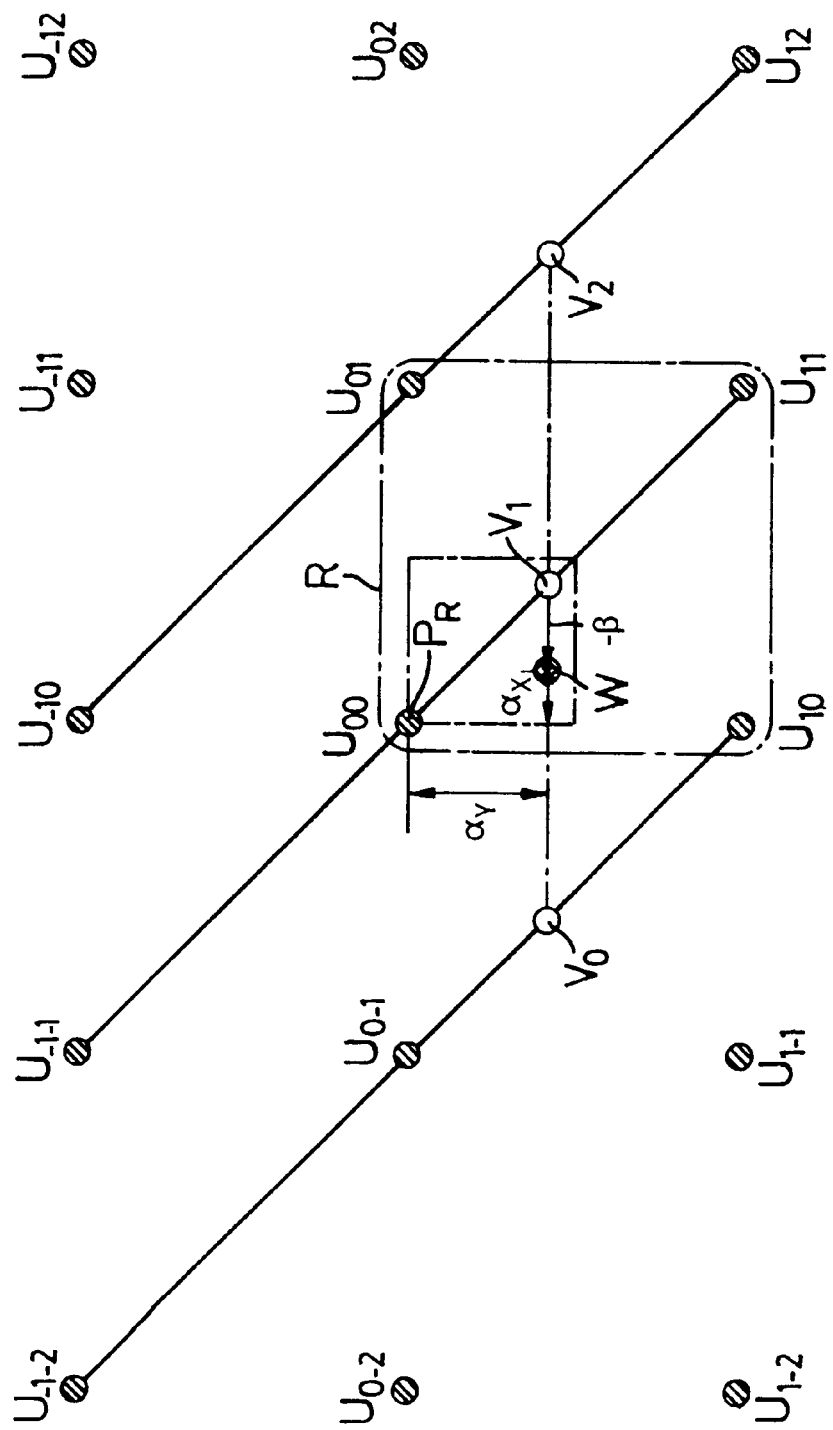
FIG. 5 is a diagram showing a negative slope oblique upsampling technique used to generate an upsampled target pixel.

FIG. 5 shows the case of an upsampled target pixel w positioned in the bottom-right quadrant with $\alpha_y$ and $\alpha_x$ once again positive. Region R is defined by pixels $U_{00}, U_{01}, U_{10}$ and $U_{11}$ with pixel $U_{00}$ defining the reference pixel $P_R$. Intermediate pixels $v_0$, $v_1$ and $v_2$ are also shown and have been computed using oblique up-left interpolation. The intermediate pixels $v_0$, $v_1$ and $v_2$ are computed using the following equations:

$$v_0 = (1-\alpha_y)U_{0-0} + \alpha U_{10} \tag{12}$$

$$v_1 = (1-\alpha_y)U_{00} + \alpha_y U_{11} \tag{13}$$

$$v_2 = (1-\alpha_y)U_{01} + \alpha_y U_{12} \tag{14}$$

After the three upsampled intermediate pixels have been computed, interpolations are performed non-orthogonally horizontally between the two intermediate pixels on opposite sides of the upsampled target pixel w to determine the value of the upsampled target pixel. In the example of FIG. 5, since upsampling has been performed along 45° diagonal lines, the horizontal distance from intermediate pixel $v_1$ to reference pixel $U_{00}$ is the same as the vertical distance, namely $\alpha_y$. Thus, the distance $\beta$ from the upsampled target pixel w to the intermediate pixel $v_1$ is equal to $\alpha_x - \alpha_y$. In fact this equation for $\beta$ in oblique up-left upsampling is valid for all quadrants. $\beta$ is negative in this case implying that the interpolation is between intermediate pixels $v_1$ and $v_0$. Therefore, the value of the upsampled target pixel w is computed using the following equation:

$$w = (1-(-\beta))v_1 + (-\beta)v_0 \tag{15}$$

In other quadrants, the intermediate pixels v and the upsampled target pixel w are calculated in a similar manner using different selected pixels of the source data that surround the reference pixel $P_R$.

When the oblique up-right interpolation direction $O_R$ is selected, the intermediate pixels $v_0$, $v_1$ and $v_2$ are computed by interpolating linearly between selected pixels of the source data located along positively sloped diagonal lines in a similar manner to that described above with reference to FIG. 5.

Figure 6:
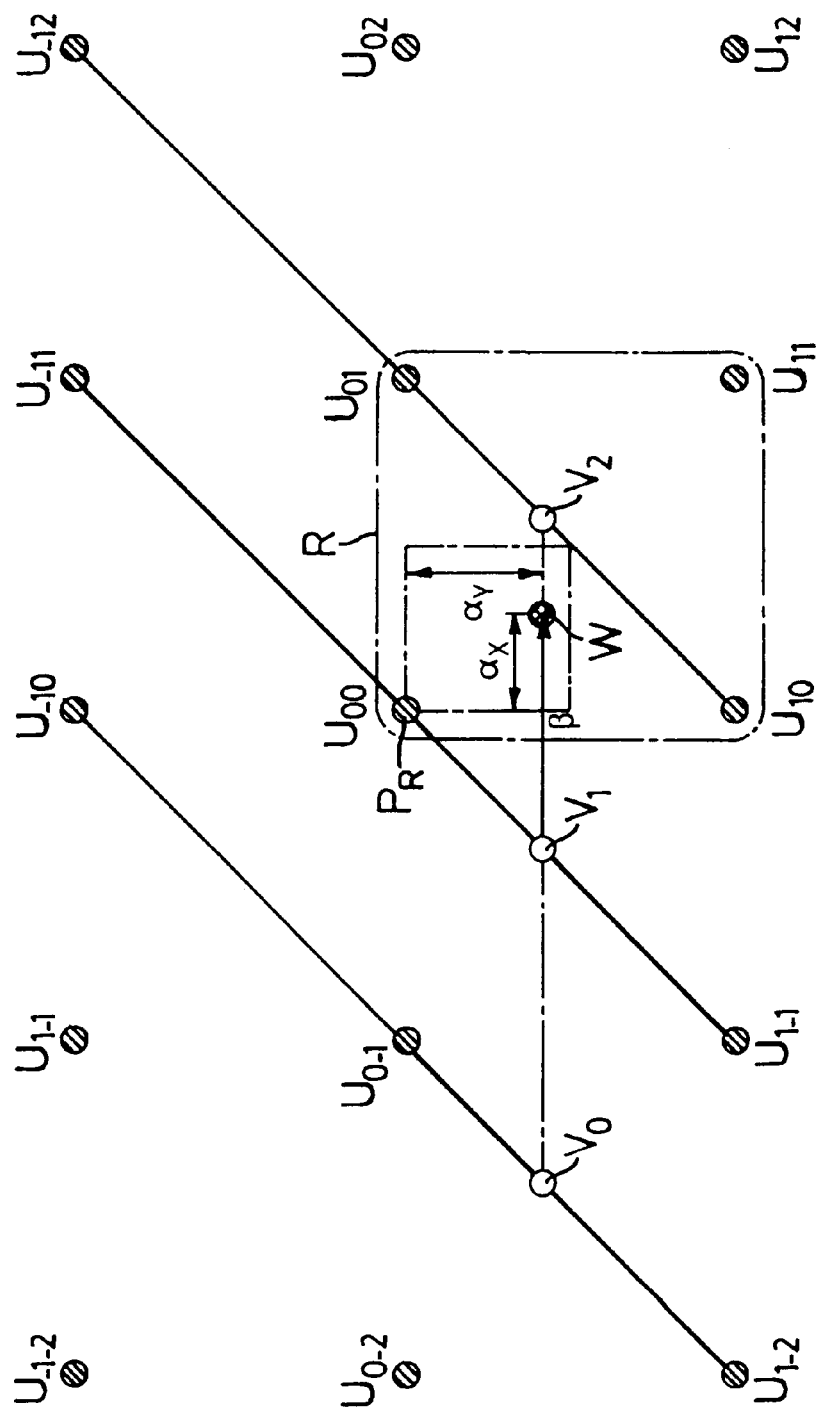
FIG. 6 is a diagram showing a positive slope oblique upsampling technique used to generate an upsampled target pixel.
Figure 7A:
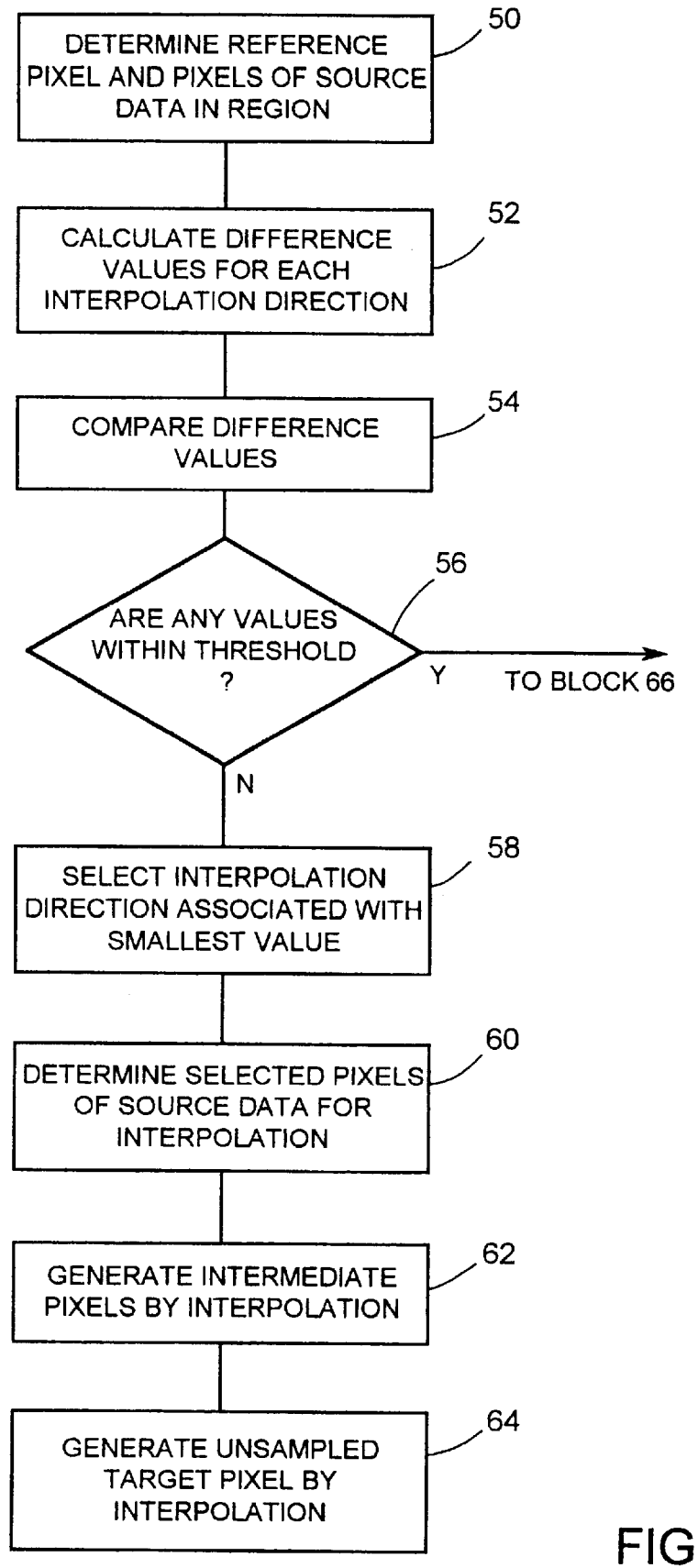
FIGS. 7a and 7b are flowcharts showing the steps performed in the first method when generating an upsampled target pixel from the source data.
Figure 7B:
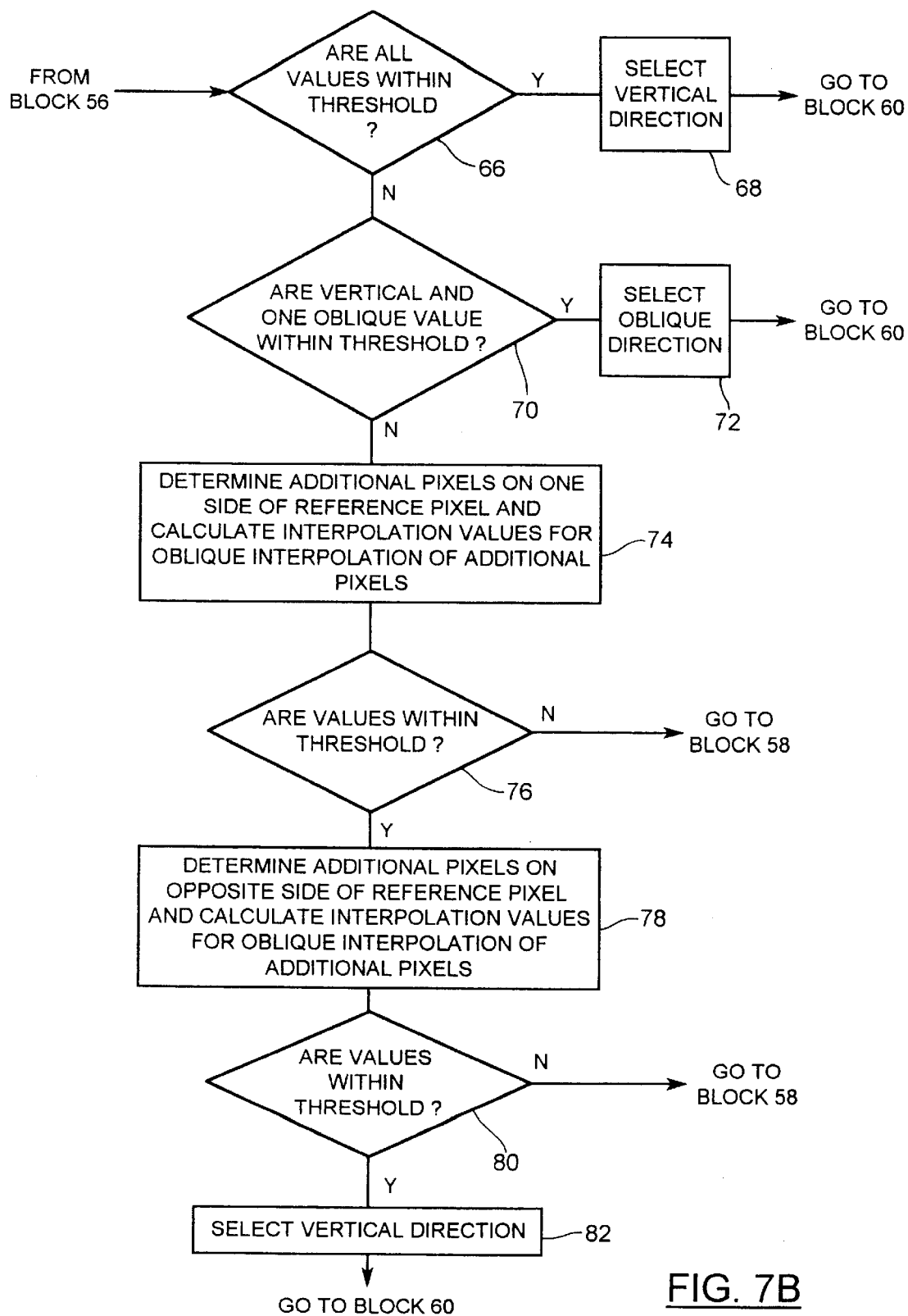

FIG. 6 shows an upsampled target pixel w positioned in the region R defined by pixels $U_{00}$, $U_{01}$, $U_{10}$ and $U_{11}$ with pixel $U_{00}$ defining the reference pixel $P_R$. Intermediate pixels $v_0$, $v_1$ and $v_2$ are also shown and have been computed using oblique up-right interpolation. The intermediate pixels $v_0$, $v_1$ and $v_2$ are computed using the following equations:

$$v_0 = (1-\alpha_y)U_{0-1} + \alpha_y U_{1-2} \quad (16)$$

$$v_1 = (1-\alpha_y)U_{00} + \alpha_y U_{1-1} \quad (17)$$

$$v_2 = (1-\alpha_y)U_{01} + \alpha_y U_{10} \quad (18)$$

After the three upsampled intermediate pixels have been computed, interpolations are performed non-orthogonally horizontally between the two intermediate pixels on opposite sides of the upsampled target pixel w to determine the value of the upsampled target pixel. For oblique up-right upsampling it can be shown that $\beta = \alpha_x + \alpha_y$. In the case of FIG. 6, $\beta$ is positive implying that the interpolation is between intermediate pixels $v_1$ and $v_2$. The value of the upsampled target pixel w is computed using the following equation:

$$w = (1-\beta)v_1 + \beta v_2 \quad (19)$$

In other quadrants, the intermediate pixels v and the upsampled target pixel w are calculated in a similar manner using different selected pixels of the source data that surround the reference pixel $P_R$.

The above-described method shows access to three lines of source data to demonstrate the cases for the four possible quadrants. It should be noted, however, that once the upsampling quadrant is known only two lines of source data are needed to perform the interpolations and generate the upsampled target pixel.

Figure 8:
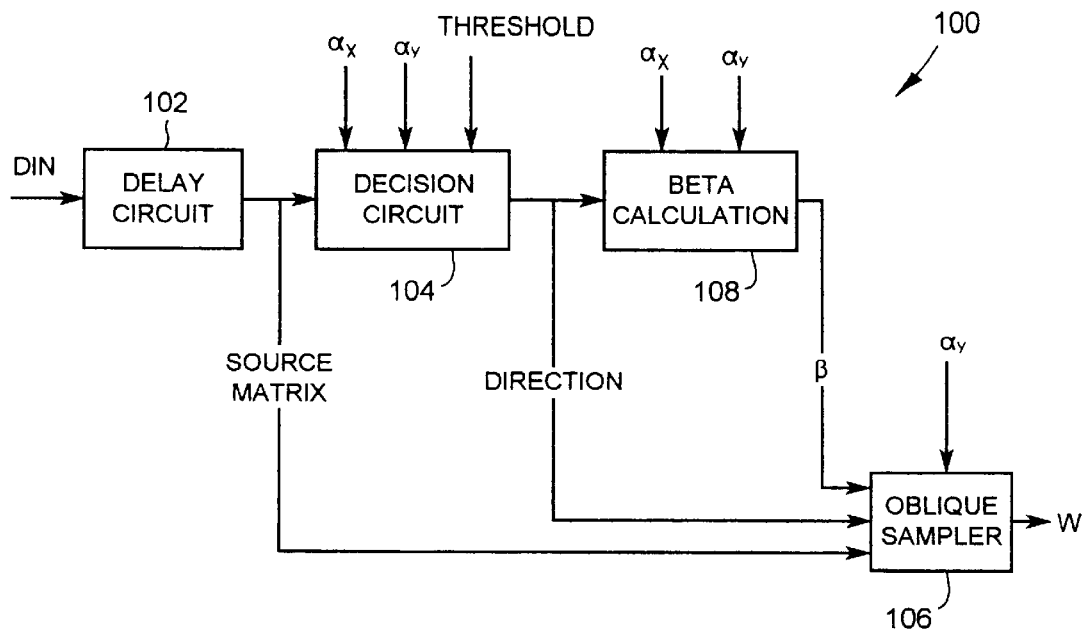
FIG. 8 is a block diagram showing an apparatus for generating upsampled target pixels from input source data.

Referring now to FIG. 8, a source data interpolation apparatus for carrying out the above described method is shown and is generally indicated by reference numeral 100. The apparatus 100 receives a stream of input digital source data $D_{in}$ and interpolates between selected pixels U of the source data in order to generate upsampled target pixels w.

The apparatus 100 includes a delay circuit 102 receiving the stream of source data. The delay circuit extracts the required pixels of the source data necessary to generate the desired upsampled target pixel w and passes the required pixels of source data to a decision circuit 104 as well as to an oblique upsampler 106. The decision circuit 104 performs calculations numbered 1 to 3 and 4 to 7 on the pixels of source data if necessary and compares the calculated difference values with the threshold to determine the desired interpolation direction. The interpolation direction output of the decision circuit 104 is fed to the oblique upsampler 106 and to a $\beta$ calculator 108. The output of the $\beta$ calculator 108 is applied to the oblique upsampler 106 which uses the input data to generate the desired upsampled target pixel w.

Figure 9:
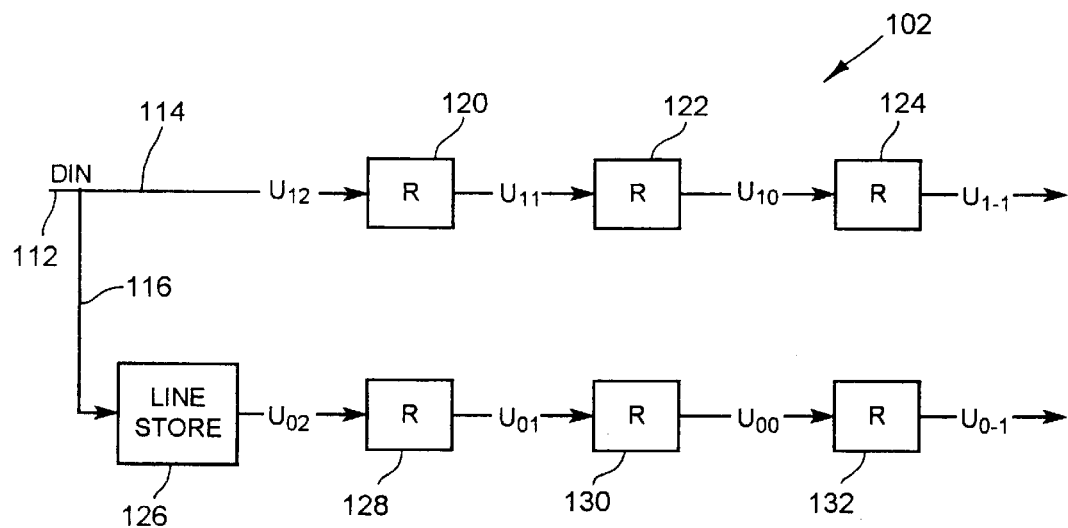
FIG. 9 is a schematic of a delay circuit forming part of the apparatus illustrated in FIG. 8.

FIG. 9 better illustrates the delay circuit 102. As can be seen, the delay circuit has an input line 112 receiving the stream of input source data necessary to generate the desired upsampled target pixel w. The input line branches, with one branch 114 leading directly to three delay elements 120, 122 and 124 connected in series. The other branch 116 leads to a line store 126. The output of the line store 126 leads to three delay elements 128, 130 and 132 connected in series. The line store and the delay elements in each branch allow the delay circuit 102 to output four pixels from two consecutive lines of input source data simultaneously. For the case of interpolating in the bottom-right quadrant, with both $\alpha_x$ and $\alpha_y$ positive, the eight pixels extracted correspond to pixels $U_{0-1}$, $U_{00}$, $U_{01}$, $U_{02}$, $U_{1-1}$, $U_{10}$, $U_{11}$, and $U_{12}$ as shown.

Figure 10:
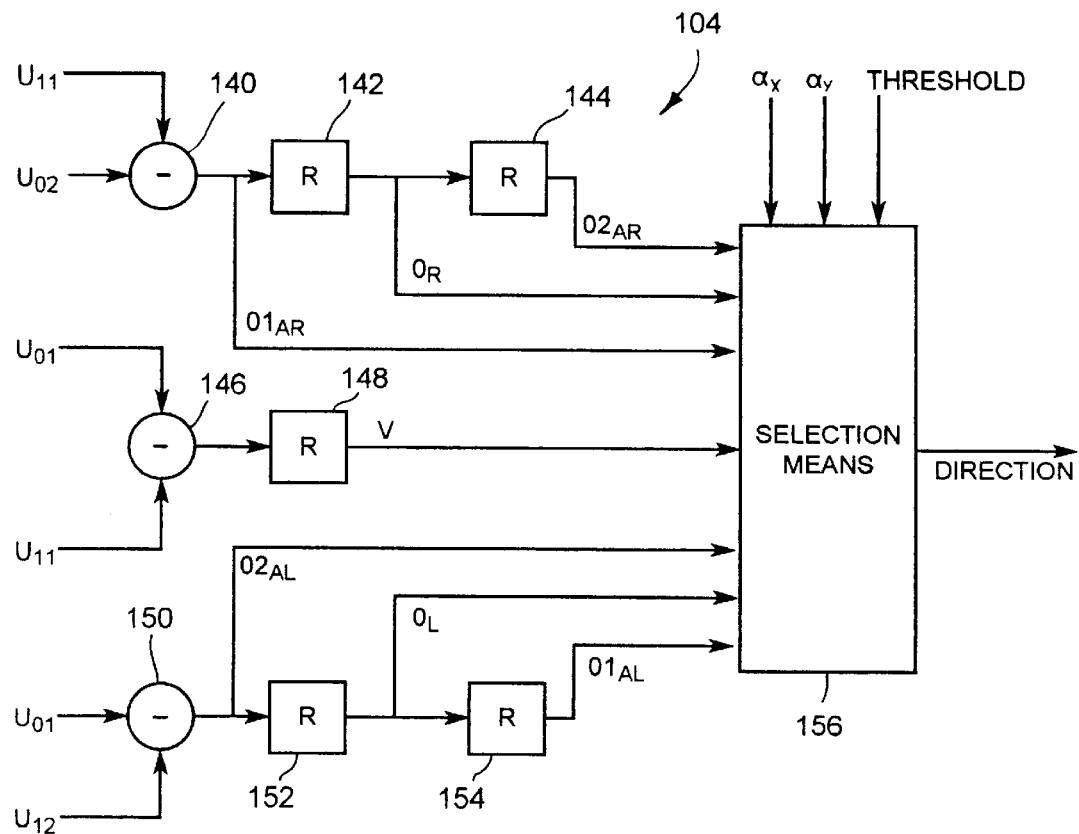
FIG. 10 is a schematic of a decision circuit forming part of the apparatus illustrated in FIG. 8.

The decision circuit 104 is best seen in FIG. 10 and has six input lines, each of which receives a selected pixel output by the delay circuit 102. The inputs are applied pairwise to subtracters 140, 146, and 150. The outputs of the subtracters are applied through delay elements 142, 144, 148, 152 and 154 to the selection logic 156 and represent the difference value results of calculations numbered 1 to 3. The delay elements are necessary in order provide the difference value results corresponding to calculations numbered 4 to 7. Specifically, the output of subtracter 140, corresponds to $O1_{AR}$, a "future" value of $O_R$. This value is applied to delay element 142 to give $O_R$, which is then applied to delay element 144 to give $O2_{AR}$. Likewise, the output of subtracter 150 corresponding to $O2_{AL}$, is applied to delay element 152 to give $O_L$ which is then applied to delay element 154 to give $O1_{AL}$. To "equalize" the latency, delay element 148 is necessary to delay the output of subtracter 146. This value corresponds to V. All these values are passed to the selection logic 156.

The selection logic 156 which receives the $\alpha_x$ and $\alpha_y$ constants as well as the threshold value compares the calculated difference values to determine if any two or all three calculated values are within the threshold. In the cases where clearly one calculated difference value is the smallest where, the calculated difference value associated with the vertical interpolation direction and the calculated difference value associated with only one oblique interpolation direction are both within the threshold or, all three-calculated difference values are within the threshold, the selection logic 156 outputs the selected interpolation direction to the $\beta$ calculator 108 as well as to the oblique upsampler 106. In the case where the calculated difference values associated with the two oblique directions are within the threshold, the values $O1_{AR}$ and $O1_{AL}$ and possibly $O2_{AR}$ and $O2_{AL}$ are used to determine which interpolation direction to output to the $\beta$ calculator 108 and to the oblique upsampler 106.

The source pixels shown in FIG. 10 correspond to the source pixels used in interpolating in the bottom-right quadrant. These source pixels represent the "future" value of the differences.

Figure 11:
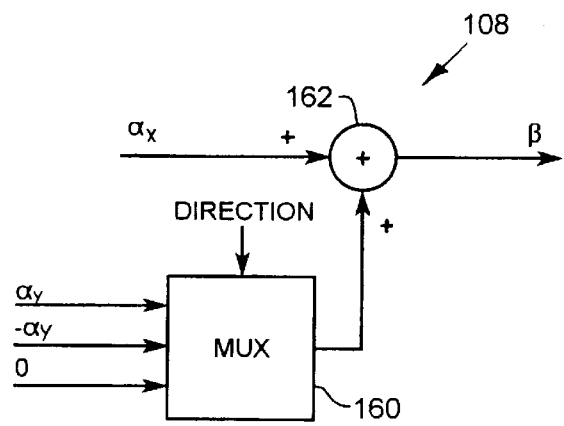
FIG. 11 is a schematic of a $\beta$ calculator forming part of the apparatus illustrated in FIG. 8.

The $\beta$ calculator 108 is best seen in FIG. 11 and includes a multiplexer 160 which receives the $\alpha_x$ and $\alpha_y$ constants as well as the interpolation direction output by the selection logic 156. The multiplexer output is supplied to an adder 162 which also receives the $\alpha_x$ constant. The output of the adder 162 constitutes the $\beta$ constant output of the $\beta$ calculator 108.

Figure 12:
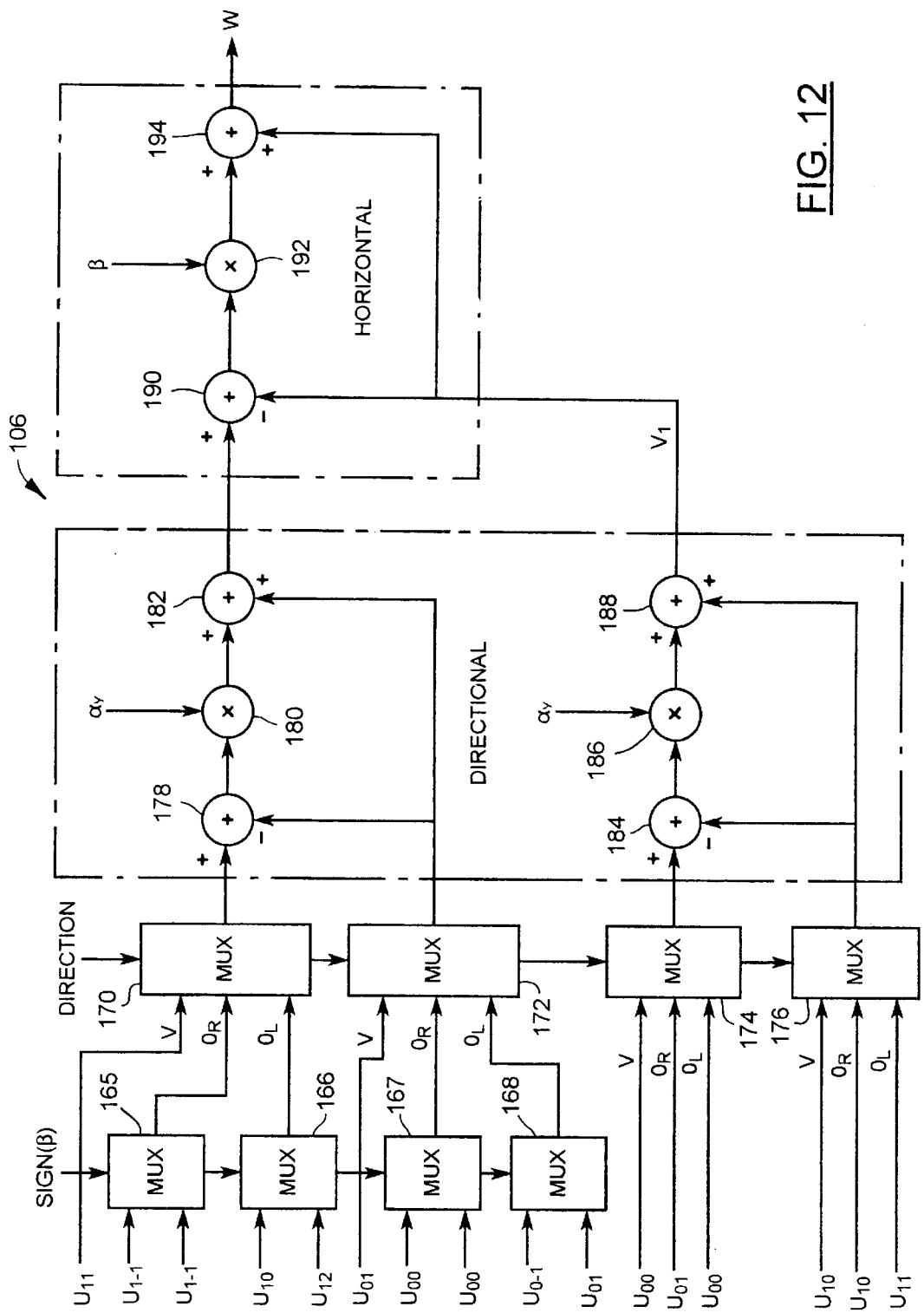
FIG. 12 is a schematic of an oblique upsampler forming part of the apparatus illustrated in FIG. 8.

FIG. 12 best illustrates the oblique upsampler 106 and as can be seen it comprises three linear interpolators 106a, 106b and 106c, although in principle higher order interpolations could be used. Each linear interpolator includes two adders and a multiplier. Two linear interpolators are used for directional interpolation and one for horizontal interpolation. The oblique upsampler also includes four multiplexers 165 to 168, which receive the sign of the $\beta$ constant and four multiplexers 170 to 176, each of which receives the interpolation direction from the selection logic 156. Multiplexers 165 and 166 provide output to multiplexer 170 and multiplexers 167 and 168 provide output to multiplexer 172.

The source pixels input to multiplexers 165 to 168 and multiplexers 174 to 176 illustrate the case for interpolating the bottom right quadrant. Multiplexers 170 and 172 provide output to linear interpolator 106a. Linear interpolator 106a includes an adder 178 receiving input from multiplexers 170 and 172 which supplies input to a multiplier 180. The multiplier 180 which receives the $\alpha_y$ constant provides input to another adder 182 which also receives input from multiplexer 172.

Similarly, multiplexers 174 and 176 provide output to linear interpolator 106b. Linear interpolator 106b includes an adder 184 receiving input from multiplexers 174 and 176 which supplies input to a multiplier 186. The multiplier 186 which receives the $\alpha_y$ constant provides input to another adder 188 which also receives input from multiplexer 176.

The output of the two linear interpolators 106a and 106b respectively are supplied to linear interpolator 106c. Linear interpolator 106c includes an adder 190 receiving input from the adders 182 and 188 which supplies input to multiplier 192. The multiplier 192 receives the $\beta$ constant from the $\beta$ calculator 108 and supplies input to adder 194. Adder 194 also receives the output of adder 188 and generates as its output the value of the upsampled target pixel w.

The input pixels and shifting of the multiplexers 174 and 176 are controlled so that the output of adder 188 represents intermediate pixel $v_1$ (i.e. the intermediate pixel closest to the reference pixel $P_R$). The input pixels and shifting of the multiplexers 165 to 168, 170 and 172 are controlled so that the output of adder 182 represents either intermediate pixel $v_0$ or intermediate pixel $v_2$ depending upon the position of the upsampled target pixel w on the intermediate line segment. The designators V, $O_R$ and $O_L$ input to multiplexers 170 to 176 in FIG. 12 refer to the source pixels that are used to interpolate in the vertical, oblique right and oblique left directions respectively.

The linear interpolator 106c constituted by adders 190 and 194 and multiplier 192 performs the calculation representing the non-orthogonal horizontal interpolation between the intermediate pixels.

The following chart sets out the directional interpolations performed by the oblique upsampler 106 for all values of $\alpha_x$ and $\alpha_y$ in order to generate the intermediate pixels v. The value of $\beta$ for each interpolation direction is also included.

| Interpolation Direction | $\alpha_y$ | Intemediate Pixels $v_0, v_1, v_2$ | $\beta$ |
|---|---|---|---|
| Vertical | $\alpha_y \geq 0$ | $v_0 = u_{0-1} + (u_{1-1} - u_{0-1})\alpha_y$ | $\beta = \alpha_x$ |
| | | $v_1 = u_{00} + (u_{10} - u_{00})\alpha_y$ | |
| | | $v_2 = u_{01} + (u_{11} - u_{01})\alpha_y$ | |
| | $\alpha_y < 0$ | $v_0 = u_{0-1} + (u_{-1-1} - u_{0-1})(-\alpha_y)$ | |
| | | $v_1 = u_{00} + (u_{-10} - u_{00})(-\alpha_y)$ | |
| | | $v_2 = u_{01} + (u_{-11} - u_{01})(-\alpha_y)$ | |
| Oblique Up-Left | $\alpha_y \geq 0$ | $v_0 = u_{0-1} + (u_{10} - u_{0-1})\alpha_y$ | $\beta = \alpha_x - \alpha_y$ |
| | | $v_1 = u_{00} + (u_{11} - u_{00})\alpha_y$ | |
| | | $v_2 = u_{01} + (u_{12} - u_{01})\alpha_y$ | |
| | $\alpha_y < 0$ | $v_0 = u_{0-1} + (u_{-1-2} - u_{0-1})(-\alpha_y)$ | |
| | | $v_1 = u_{00} + (u_{-1-1} - u_{00})(-\alpha_y)$ | |
| | | $v_2 = u_{01} + (u_{-10} - u_{01})(-\alpha_y)$ | |
| Oblique Up-Right | $\alpha_y \geq 0$ | $v_0 = u_{0-1} + (u_{1-2} - u_{0-1})\alpha_y$ | $\beta = \alpha_x + \alpha_y$ |
| | | $v_1 = u_{00} + (u_{1-1} - u_{00})\alpha_y$ | |
| | | $v_2 = u_{01} + (u_{10} - u_{01})\alpha_y$ | |
| | $\alpha_y < 0$ | $v_0 = u_{0-1} + (u_{-10} - u_{0-1})(-\alpha_y)$ | |
| | | $v_1 = u_{00} + (u_{-11} - u_{00})(-\alpha_y)$ | |
| | | $v_2 = u_{01} + (u_{-12} - u_{01})(-\alpha_y)$ | |

As one of skill in the art will appreciate, once the intermediate pixels v and the value of $\beta$ are known, the upsampled target pixel w can be generated by horizontal interpolation using one of the following equations:

$$w = v_1 + (v_2 - v_1)\beta;\ \beta \geq 0 \qquad (20)$$

$$w = v_1 + (v_0 - v_1)(-\beta);\ \beta < 0 \qquad (21)$$

Referring now to FIGS. 13 to 28, another embodiment of a method for generating upsampled target pixels using seven possible interpolation directions and a four-point interpolator will now be described.

Similar to the previous embodiment, the input source data is examined to determine the closest source pixel to the upsampled target pixel w and that source pixel is used as a reference pixel $P_R$. Source pixels from the two source lines above the upsampled target pixel, and the two source lines below the upsampled target pixel are determined (see block 210 in FIG. 23a) and selected pixels of these source lines are compared to determine interpolation direction to be selected when generating the upsampled target pixel. The source pixels are used to calculate difference values for six possible oblique directions (block 212). The calculations vary depending upon the quadrant of interpolation and are shown in the following chart:

| Top-Left | Top-Right | Bottom-Left | Bottom-Right | Associated Interpolation Direction | | |
|---|---|---|---|---|---|---|
| abs[$U_{0-1} - U_{-10}$] | abs[$U_{00} - U_{-11}$] | abs[$U_{00} - U_{1-1}$] | abs[$U_{01} - U_{10}$] | 45° line up-right | $O_{UR}$ | (1) |
| abs[$U_{00} - U_{-1-1}$] | abs[$U_{01} - U_{-10}$] | abs[$U_{0-1} - U_{10}$] | abs[$U_{00} - U_{11}$] | 45° line up-left | $O_{UL}$ | (2) |
| abs[$U_{0-1} - U_{-11}$] | abs[$U_{00} - U_{-12}$] | abs[$U_{00} - U_{1-2}$] | abs[$U_{01} - U_{1-1}$] | 26.6° line up-right-right | $O_{URR}$ | (3) |
| abs[$U_{00} - U_{-1-2}$] | abs[$U_{01} - U_{-1-1}$] | abs[$U_{0-1} - U_{11}$] | abs[$U_{00} - U_{12}$] | 26.6° line up-left-left | $O_{ULL}$ | (4) |
| abs[$U_{1-1} - U_{-10}$] | abs[$U_{00} - U_{-21}$] | abs[$U_{00} - U_{2-1}$] | abs[$U_{-11} - U_{10}$] | 63.4° line up-up-right | $O_{UUR}$ | (5) |
| abs[$U_{00} - U_{-2-1}$] | abs[$U_{11} - U_{-10}$] | abs[$U_{-1-1} - U_{10}$] | abs[$U_{00} - U_{21}$] | 63.4° line up-up-left | $O_{UUL}$ | (6) |
| | | | | vertical | V | (7) |

Figure 13:
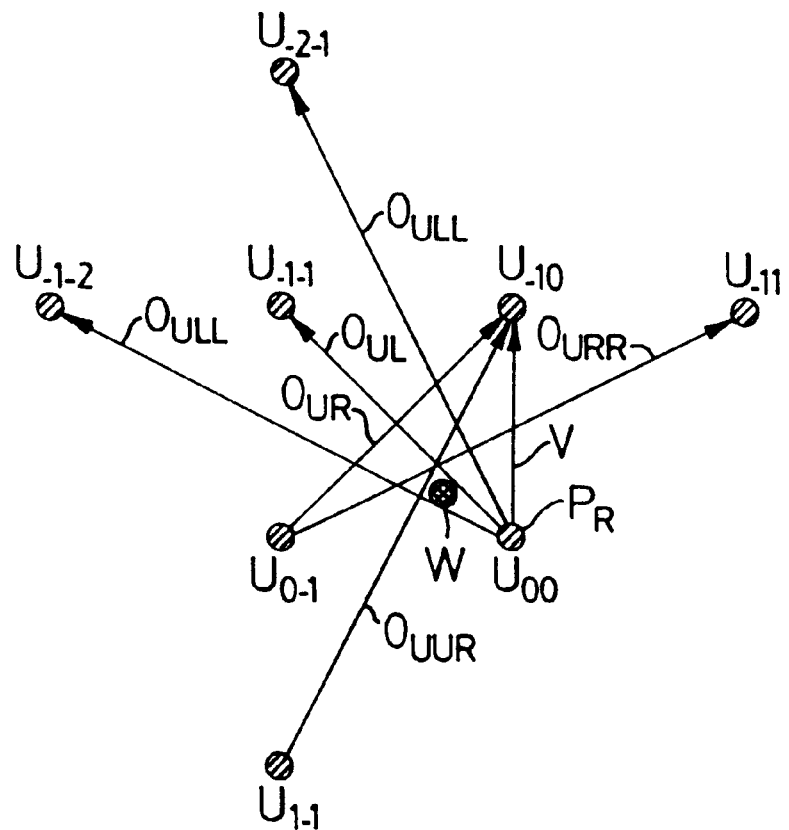
FIG. 13 is a diagram illustrating the comparisons between source pixels made in determining the interpolation direction for a second embodiment.

The interpolation directions $O_{UR}$, $O_{OUR}$, $O_{UL}$, $O_{URR}$, $O_{ULL}$, $O_{UUR}$, $U_{ULL}$, and V are illustrated in FIG. 13 for the top-left quadrant. No difference values are calculated for the vertical direction V shown.

The calculations yield a set of difference values associated with each oblique interpolation direction. The set of difference values to the right of the reference pixel under consideration and the set of difference values to the left of the reference pixel are also used. The three sets of difference values are summed for each oblique interpolation direction yielding a "working" set of difference values. The difference values of this working set are compared with each other to determine the smallest differences within a threshold (blocks 214 and 216). If the smallest differences are sufficiently small to indicate low-frequency edges then they yield a set of possible interpolation directions.

Figure 14:
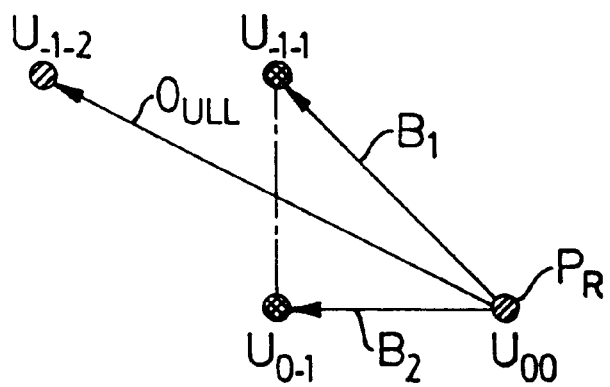
FIG. 14 is a diagram illustrating a boundary crossing situation.

The possible interpolation directions are then examined to see if a "boundary crossing" situation occurs (blocks 218 and 220). FIG. 14 demonstrates this situation. Here the up-left-left direction representing a white line joining pixels $U_{))}$ and $U_{-1-2}$ is being considered, however there is a dark grey "boundary" joining pixels $U_{0-1}$ and $U_{-1-1}$. Selecting the up-left-left direction would cross the boundary, and therefore the up-left-left direction can not be considered. This situation is detected by examining differences $B_1$ and $B_2$.

The possible interpolation directions are then examined and a single interpolation direction is selected (block 222). Block 222 is expanded in FIG. 23b. If only one oblique interpolation direction is possible then that direction is chosen (blocks 230 and 232). If no low-frequency edges are detected then the vertical interpolation direction is chosen as default (blocks 238 and 240). If both a leftward and a rightward oblique interpolation direction are possible, then the vertical direction is again chosen as default (blocks 248 and 250).

Otherwise only either rightward or leftward oblique interpolation directions are under consideration. If only one of the "extreme" directions (either 26.6° or 63.4° obliques) and the 45° oblique direction are possible then that extreme direction is chosen (blocks 252 and 254). Otherwise both extremes are possible and the "middle" direction (the 45° oblique) is chosen (block 256).

Once the interpolation direction is chosen, the pixels required for the directional interpolation must be determined (block 224). The source data is then directionally interpolated to generate the intermediate pixels (block 226). Finally the intermediate pixels are interpolated horizontally to generate the desired upsampled target pixel w (block 228).

The location of the upsampled target pixel w, is defined by its distances from the reference pixel $P_R$ both in the x and y directions. These distances are represented by the terms $\alpha_x$ and $\alpha_y$ where:

$$-0.5 < \alpha_x \leq 0.5;$$

and $$-0.5 < \alpha_y \leq 0.5;$$

$\alpha_x$ being positive to the right and $\alpha_y$ being positive downward.

In this embodiment, a four-point "filter" interpolator is used. Interpolated upsampled target pixels w are calculated as a function of four source pixels, $S_0$, $S_1$, $S_2$ and $S_3$, and a parameter a representing the distance of the desired pixel from $S_1$:

$$w = f(S_0, S_1, S_2, S_3, \alpha)$$

This function may be a four-tap filter with coefficients read from a ROM indexed by parameter $\alpha$.

Figure 15:
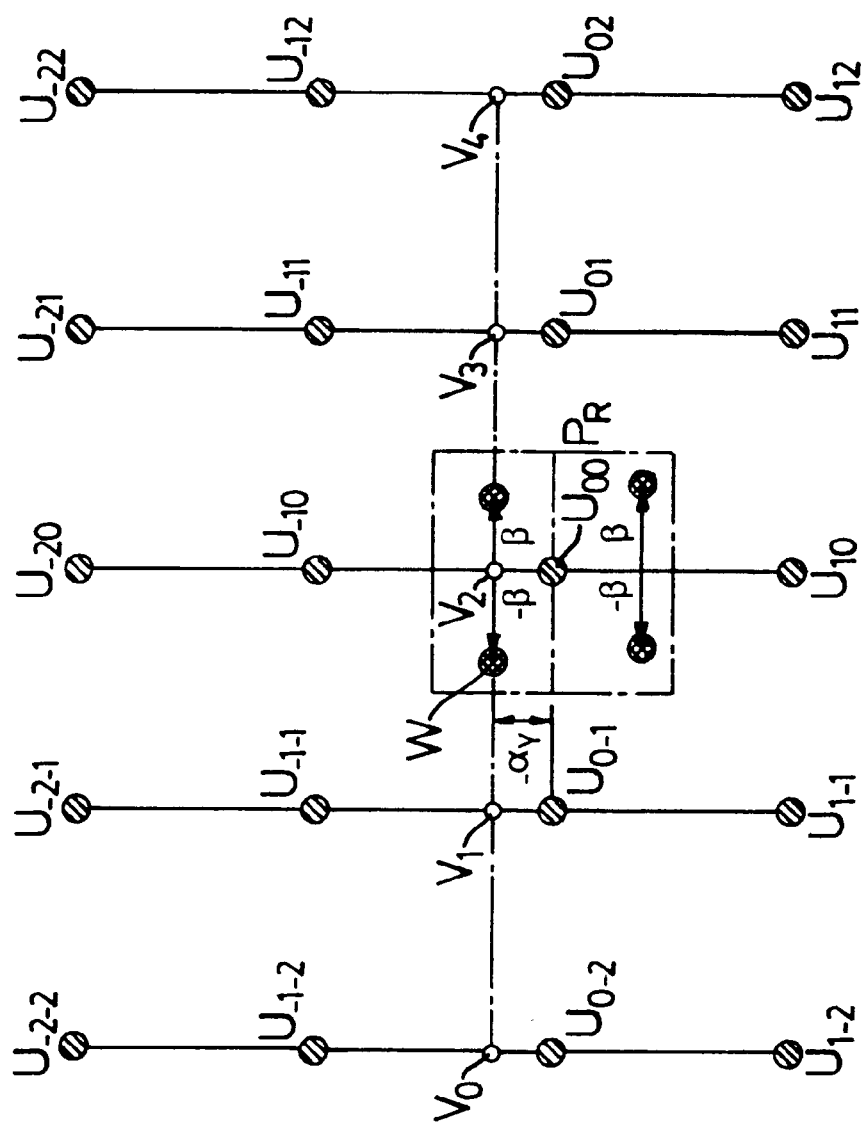
FIG. 15 is a diagram showing a vertical upsampling technique used to generate an upsampled target pixel.

FIG. 15 shows the case when the vertical interpolation direction V is selected. The target pixel w is positioned in the "Top-Left" quadrant with $\alpha_x$ and $\alpha_y$ both negative. The intermediate horizontal line segment represented by the values $v_i$, is determined by vertical four-point interpolation as follows:

$$v_0 = f(U_{1-2}, U_{0-2}, U_{-2-2}, U_{-2-2}, -\alpha_y)$$
$$v_1 = f(U_{1-1}, U_{0-1}, U_{-1-1}, U_{-2-1}, -\alpha_y)$$
$$v_2 = f(U_{10}, U_{00}, U_{-10}, U_{-20}, -\alpha_y)$$
$$v_3 = f(U_{11}, U_{01}, U_{-11}, U_{-21}, -\alpha_y)$$
$$v_4 = f(U_{12}, U_{02}, U_{-12}, U_{-22}, -\alpha_y)$$

After the five intermediate pixels are calculated, interpolations are performed on these pixels to calculate the value of the desired upsampled target pixel. The distance $\beta$, representing the horizontal distance from the target pixel w to the middle intermediate pixel, $v_2$ must first be calculated. The calculation of $\beta$ for the other three quadrants is also shown in FIG. 15. In the vertical direction case, $\beta$ is simply equal to $\alpha_x$ for all quadrants. In the case of FIG. 15, upsampled target pixel w is in the Top-Left quadrant and $\beta$ is negative. Thus, the upsampled target pixel is represented by:

$$w = f(v_3, v_2, v_1, v_0, -\beta)$$

In the other quadrants around the reference pixel $P_R$, the upsampled target pixel w can be similarly calculated.

Figure 16:
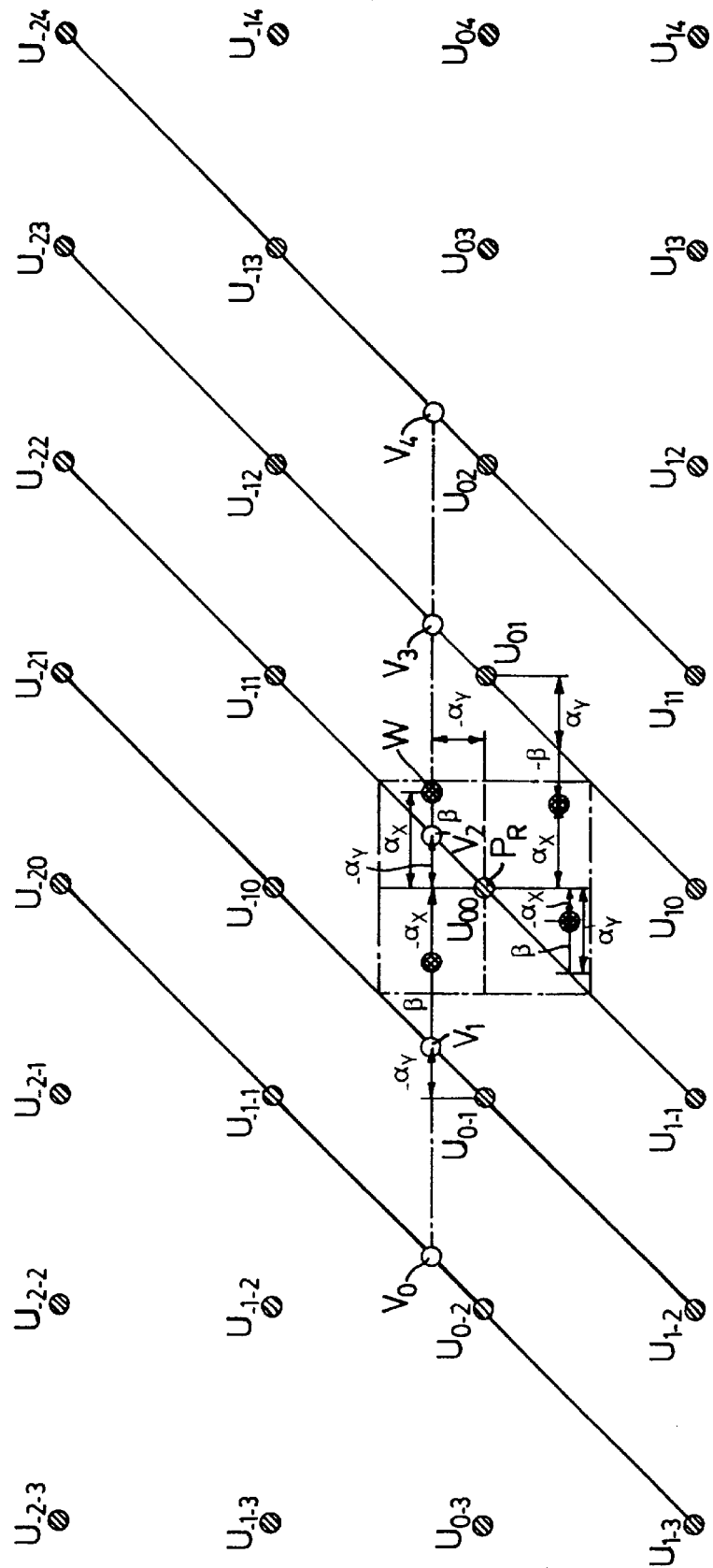
FIG. 16 is a diagram showing a positive 45° slope oblique upsampling technique used to generate an upsampled target pixel.

When the oblique up-right direction $O_{UR}$ is selected, the intermediate pixels are interpolated along positively sloped 45° diagonals. FIG. 16 shows the up-right case. The target pixel w, is positioned in the Top-Right quadrant with $\alpha_x$ positive and $\alpha_y$ negative. Using four-point interpolation along the indicated diagonals yields:

$$v_0 = f(U_{1-3}, U_{0-2}, U_{-1-1}, U_{-20}, -\alpha_y)$$
$$v_1 = f(U_{1-2}, U_{0-1}, U_{-10}, U_{-21}, -\alpha_y)$$
$$v_2 = f(U_{1-1}, U_{00}, U_{-11}, U_{-22}, -\alpha_y)$$
$$v_3 = f(U_{10}, U_{01}, U_{-12}, U_{-23}, -\alpha_y)$$
$$v_4 = f(U_{11}, U_{02}, U_{-13}, U_{-24}, -\alpha_y)$$

After the five intermediate pixels have been computed non-orthogonal, horizontal interpolation is performed to determine the upsampled target pixel w. Since the interpolation is on a 45° angle, the horizontal distance from the reference pixel $P_R$ to intermediate pixel $v_2$ is simply the vertical distance, namely, $-\alpha_y$. Thus, $\beta$ is simply $\alpha_x + \alpha_y$. In the present case, $\beta$ is positive so the upsampled target pixel is represented by:

$$w = f(v_1, v_2, v_3, v_4, \beta)$$

For other quadrants, a similar method may be used to determine the upsampled target pixel. The intermediate pixels used and $\beta$ vary from quadrant to quadrant. FIG. 16 also demonstrates the calculation of $\beta$ for each quadrant. These results are summarized in Table A below.

Figure 17:
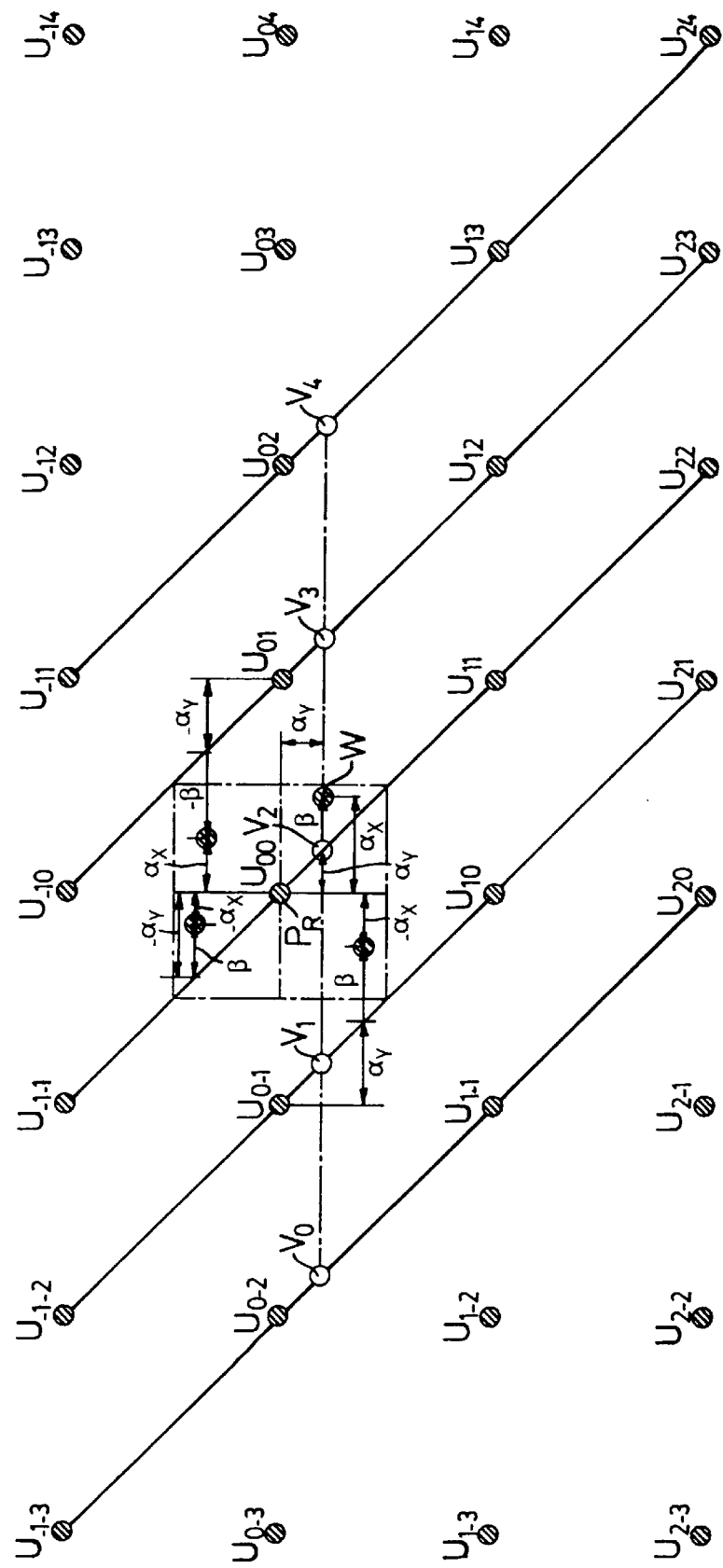
FIG. 17 is a diagram showing a negative 45° slope oblique upsampling technique used to generate an upsampled target pixel.
Figure 18:
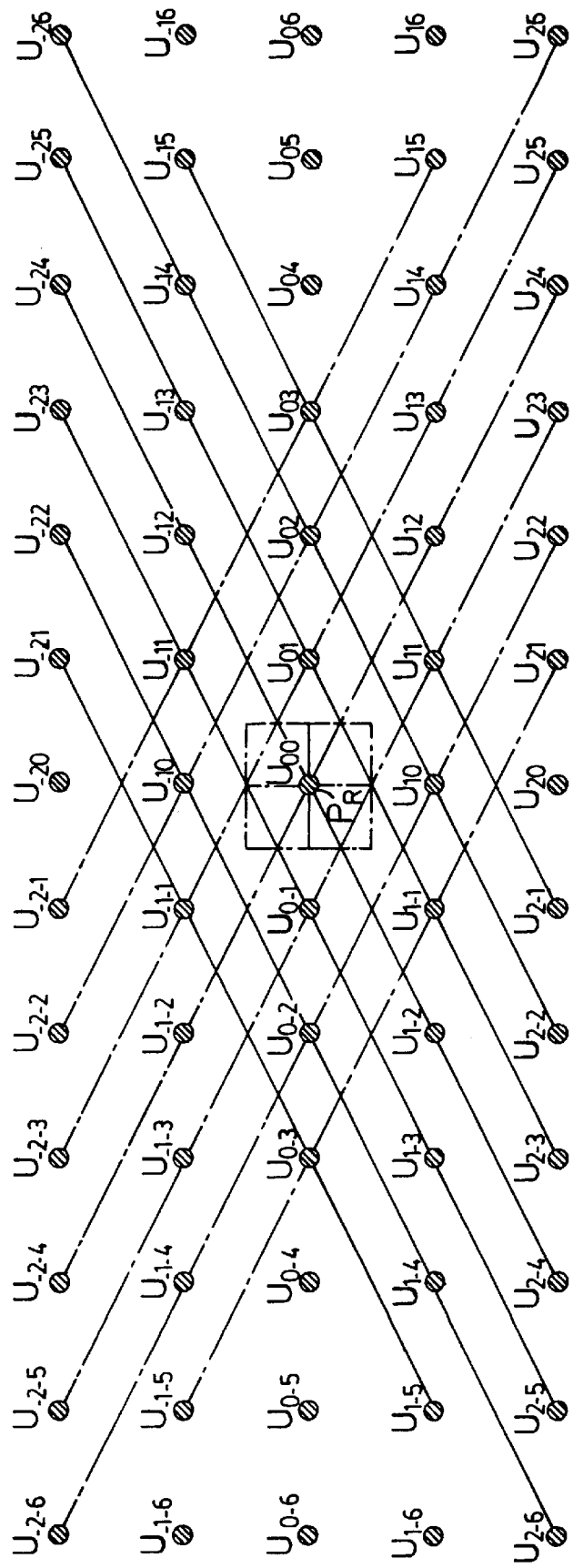
FIG. 18 is a diagram showing the source pixels used in a 26.6° slope oblique upsampling technique.

Interpolating in the oblique up-left direction $O_{UL}$ is very similar to the up-right direction. Intermediate pixels are interpolated along negatively sloped 45° diagonals. In FIG. 17, the upsampled target pixel w is in the Bottom-Right quadrant with both $\alpha_x$ and $\alpha_y$ positive. Using four-point interpolation along the diagonals:

$$v_0 = f(U_{-1-3}, U_{0-2}, U_{1-1}, U_{-20}, \alpha_y)$$
$$v_1 = f(U_{-1-2}, U_{0-1}, U_{10}, U_{21}, \alpha_y)$$
$$v_2 = f(U_{-1-1}, U_{00}, U_{11}, U_{22}, \alpha_y)$$
$$v_3 = f(U_{-10}, U_{01}, U_{12}, U_{23}, \alpha_y)$$
$$v_4 = f(U_{-11}, U_{02}, U_{13}, U_{24}, \alpha_y)$$

The upsampled target pixel is computed by performing non-orthogonal horizontal interpolation on the intermediate pixels. Again, since the interpolation is along a 45° diagonal, the horizontal distances to the intermediate pixels are equal to the vertical distances. For the Bottom-Right quadrant, $\beta = \alpha_x - \alpha_y$. With $\beta$ positive, the upsampled target pixel is represented by:

$$w = f(v_1, v_2, v_3, v_4, \beta)$$

Again a similar method applies for the other quadrants with $\beta$ varying from quadrant to quadrant. FIG. 17 demonstrates the calculation of $\beta$ for the other quadrants with the results in Table A.

When the oblique up-right-right ($O_{URR}$) or up-left-left ($O_{ULL}$) interpolation directions are selected, interpolation is along the 26.6° diagonals. The source pixels/diagonals used for four-point interpolation are shown for both the up-right-right and up-left-left directions in FIG. 18.

Figure 19:
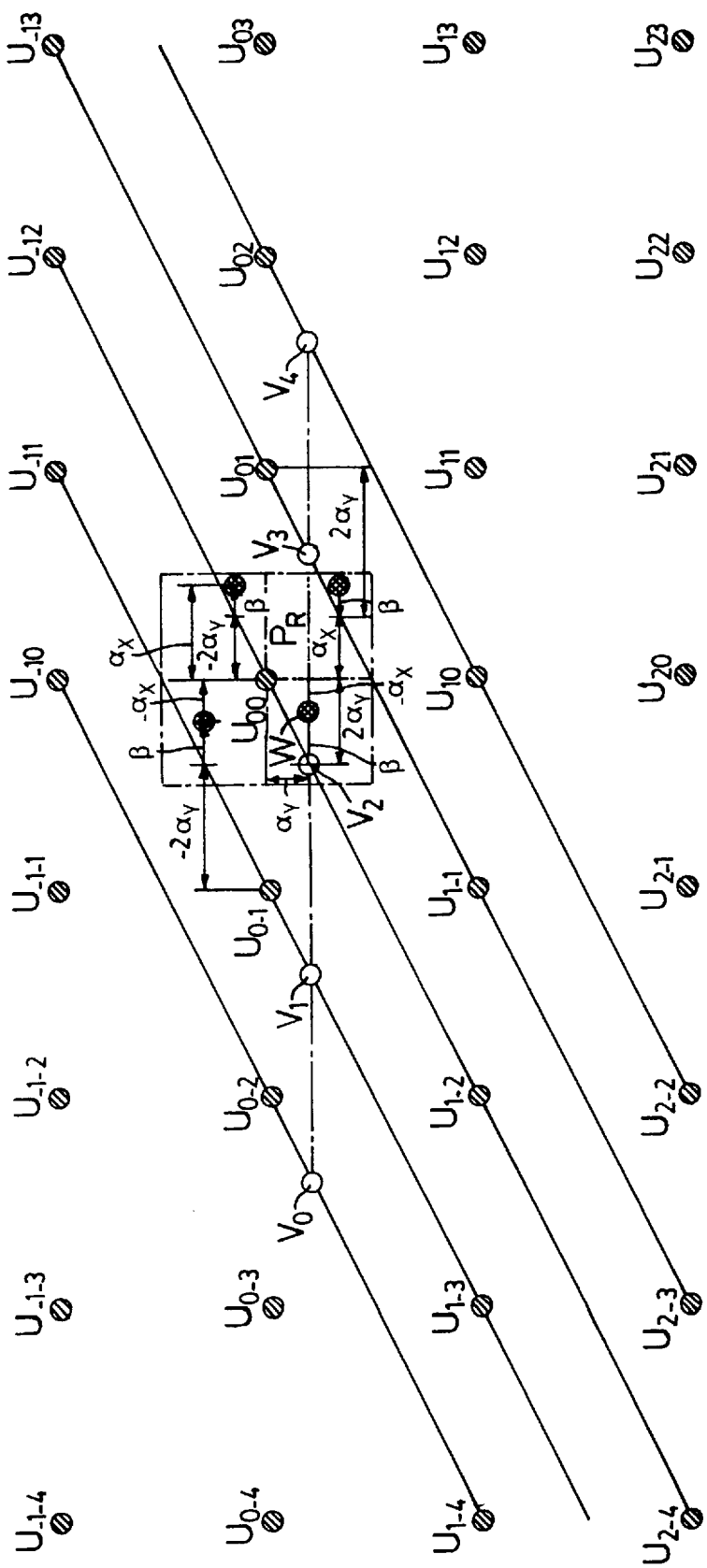
FIG. 19 is a diagram showing a positive 26.6° slope oblique upsampling technique used to generate an upsampled target pixel.

FIG. 19 shows some of the source pixels used in up-right-right $O_{URR}$ interpolation for an upsampled target pixel w in the Bottom-Left quadrant, with $\alpha_x$ negative and $\alpha_y$ positive. Using four-point interpolation along the positively sloped 26.6° diagonals:

$v_0 = f(U_{-10}, U_{0-2}, U_{1-4}, U_{2-6}, \alpha_y)$ $v_1 = f(U_{-11}, U_{0-1}, U_{1-3}, U_{2-5}, \alpha_y)$ $v_2 = f(U_{-12}, U_{00}, U_{1-2}, U_{2-4}, \alpha_y)$ $v_3 = f(U_{-13}, U_{01}, U_{1-1}, U_{2-3}, \alpha_y)$ $v_4 = f(U_{-14}, U_{02}, U_{10}, U_{2-2}, \alpha_y)$ The upsampled target pixel is calculated by horizontal interpolation. Since interpolation is along the 26.6° diagonals, horizontal distances to the intermediate pixels are twice the vertical distance. For the Bottom-Left quadrant $\beta = 2\alpha_y - (-\alpha_x) = \alpha_x + 2\alpha_y$. With $\beta$ positive, the upsampled target pixel is represented by:

$w = f(v_1, v_2, v_3, v_4, \beta)$

Similarly for other quadrants. FIG. 19 shows the calculation of $\beta$ for other quadrants as summarized in Table A.

Figure 20:
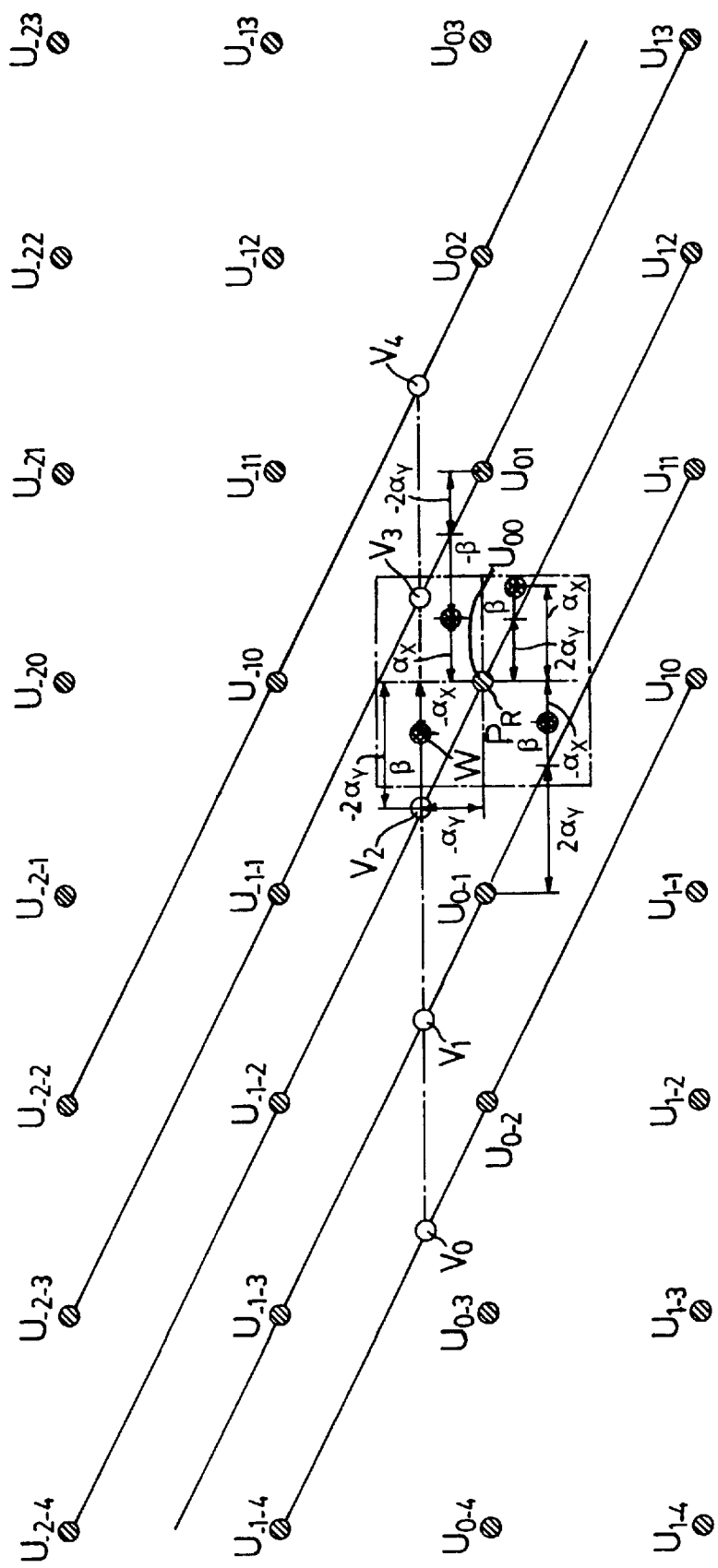
FIG. 20 is a diagram showing a negative 26.6° slope oblique upsampling technique used to generate an upsampled target pixel.

When the up-left-left interpolation direction $O_{ULL}$ is selected for interpolation, intermediate pixels are interpolated along negatively sloped 26.6° diagonals. Some of the source pixels used are shown in FIG. 20 for the Top-Left quadrant with both a and a negative. Using four-point interpolation:

$v_0 = f(U_{10}, U_{0-2}, U_{-1-4}, U_{-2-6}, -\alpha_y)$ $v_1 = f(U_{11}, U_{0-1}, U_{-1-3}, U_{-2-5}, -\alpha_y)$ $v_2 = f(U_{12}, U_{00}, U_{-1-2}, U_{-2-4}, -\alpha_y)$ $v_3 = f(U_{13}, U_{01}, U_{-1-1}, U_{-2-3}, -\alpha_y)$ $v_4 = f(U_{14}, U_{02}, U_{-10}, U_{-2-2}, -\alpha_y)$ Again since interpolation is along 26.6° diagonals, the horizontal distance to the intermediate pixels is equal to twice the vertical. For the Top-Left quadrant $\beta = -2\alpha_y - (-\alpha_x) = \alpha_x - 2\alpha_y$. With $\beta$ positive, the upsampled target pixel is represented by:

$w = f(v_1, v_2, v_3, v_4, \beta)$

A similar method applies for the other quadrant with varying $\beta$. FIG. 20 demonstrates the calculation of $\beta$ for other quadrants. The results are summarized in Table A.

When either the oblique up-up-right ($O_{UUR}$) or up-up-left ($O_{UUL}$) interpolation directions are selected, the directional interpolation involves interpolating across more source lines than in the previous cases. To avoid requiring too many source lines, linear interpolation is used for directional interpolation for the up-up-right and up-up-left directions.

Figure 21:
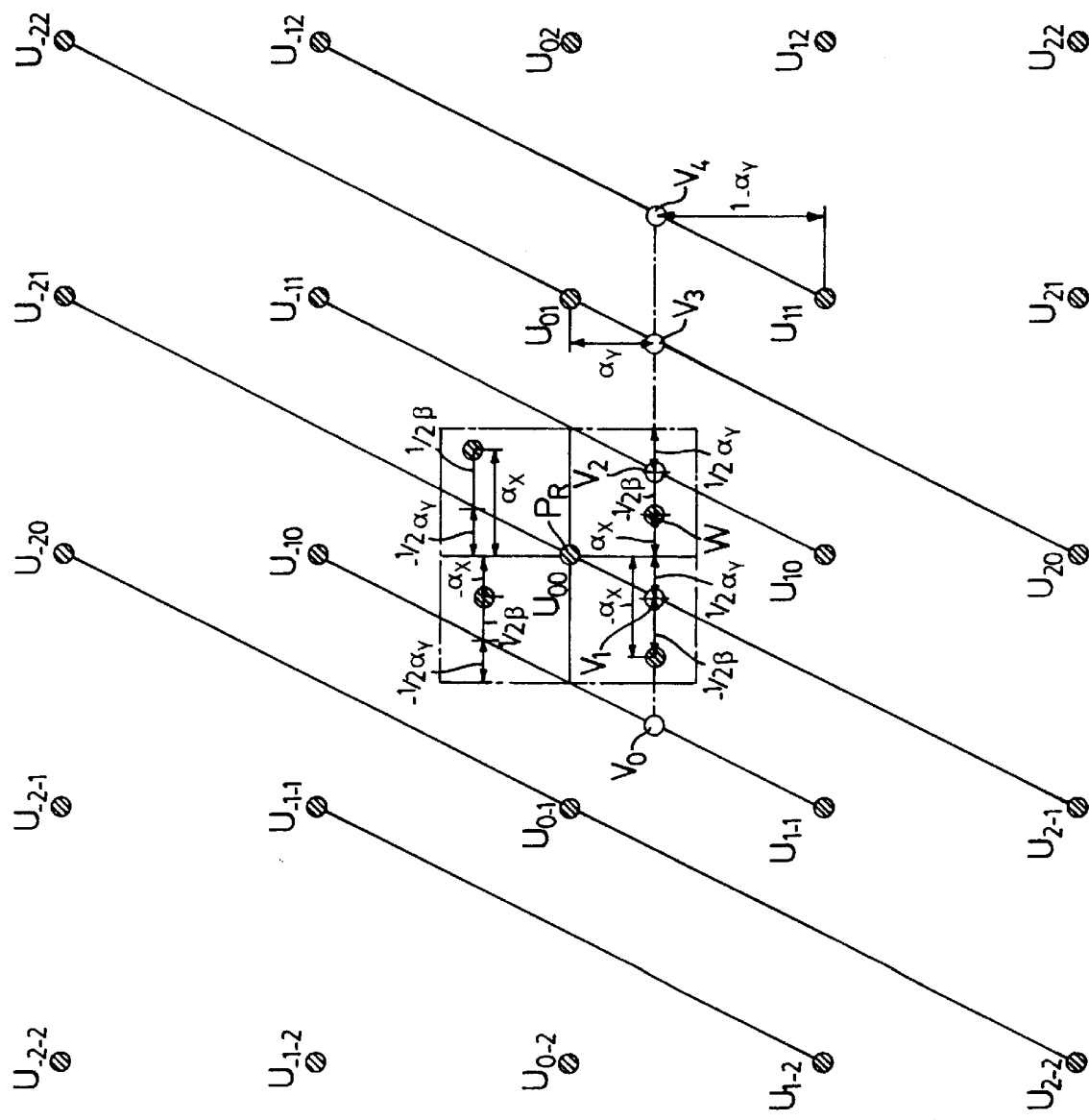
FIG. 21 is a diagram showing a positive 63.4° slope oblique upsampling technique used to generate an upsampled target pixel.

FIG. 21 illustrates the interpolations required for the up-up-right, $O_{UUR}$, interpolation direction. The upsampled target pixel w, is in the Bottom-Right quadrant with both $\alpha_x$ and $\alpha_y$ positive. Interpolation is along positively sloped, 63.4° diagonals. There are two types of these offsetting diagonals, namely the "inside" and "outside" diagonals as represented by the lines $U_{1-1}U_{-10}$ and $U_{00}U_{2-1}$ respectively. The linear upsampling parameter for the outside diagonal is given by the vertical distance $\alpha_y$ from the intermediate pixel to the source pixel. Since interpolation skips a source line, the linear upsampling parameter is halved, i.e. $\alpha_y/2$. Similarly for the inside diagonal, tie parameter is $(1-\alpha_y)/2$. Using linear interpolation, the intermediate pixels are calculated as follows:

$v_0 = (1-0.5(1-\alpha_y))U_{1-1} + 0.5(1-\alpha_y)U_{-10}$ $v_1 = (1-0.5\alpha_y)U_{00} + 0.5\alpha_y U_{2-1}$ $v_2 = (1-0.5(1-\alpha_y))U_{10} + 0.5(1-\alpha_y)U_{-11}$ $v_3 = (1-0.5\alpha_y)U_{01} + 0.5\alpha_y U_{20}$ $v_4 = (1-0.5(1-\alpha_y))U_{11} + 0.5(1-\alpha_y)U_{-12}$ The upsampled target pixel is calculated by non-orthogonal horizontal interpolation. Four-point interpolation is still used horizontally. Since interpolation is along the 63.4° diagonals, horizontal distances to the intermediate pixels are half the vertical distance. Additionally, since the spacing between intermediate pixels is half the spacing for the previous interpolation directions, $\beta$ is twice the distance from the centre intermediate pixel to the target pixel. For the Bottom-Right quadrant $0.5 = \alpha_x 0.5\beta + 0.5\alpha_y$. So $\beta = -1 + 2\alpha_x + \alpha_y$. With $\beta$ negative, the upsampled target pixel is represented by:

$w = f(v_3, v_2, v_1, v_0 - \beta)$

Similarly for other quadrants. FIG. 21 shows the calculation of $\beta$ for other quadrants as summarized in Table A.

Figure 22:
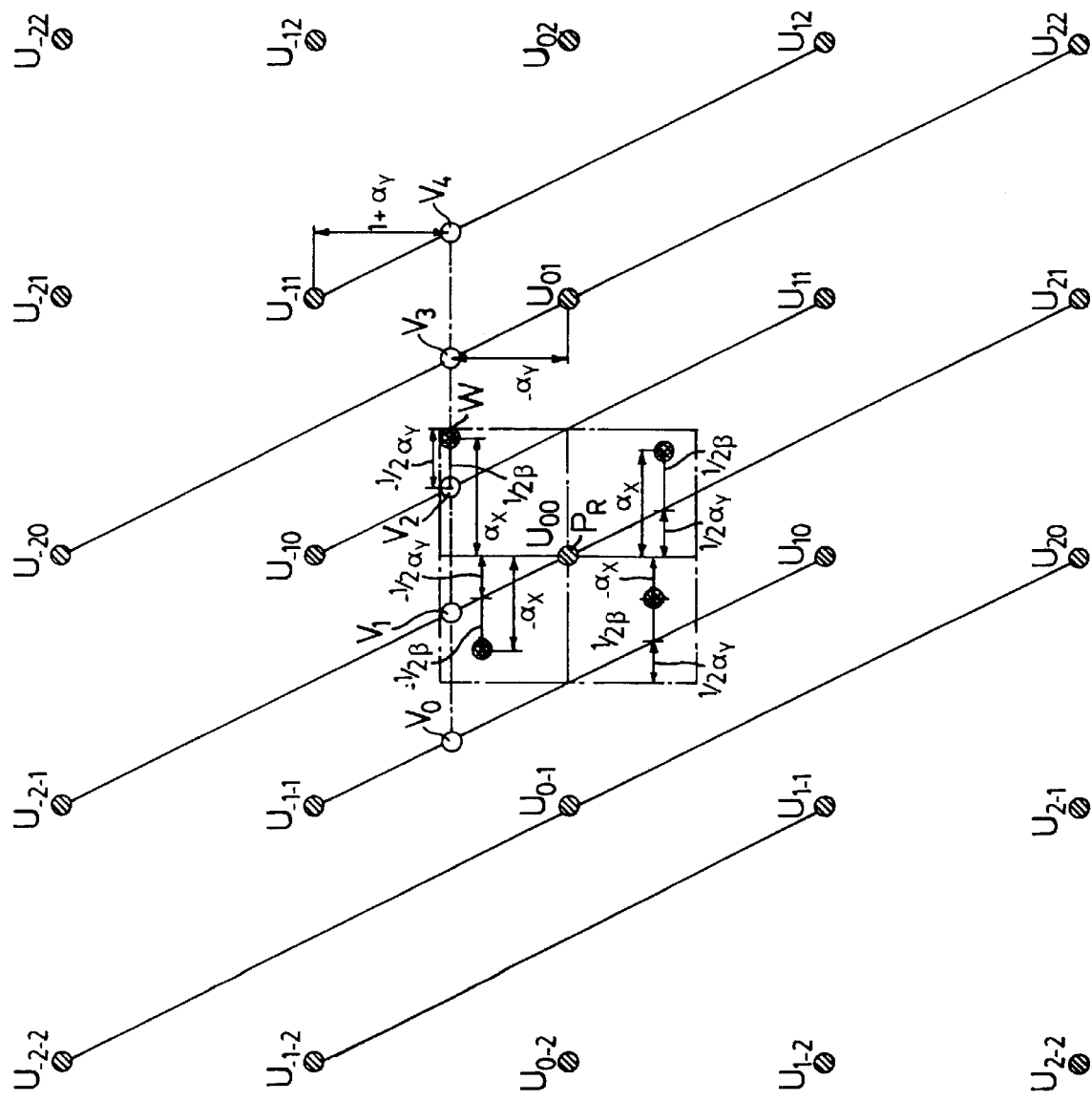
FIG. 22 is a diagram showing a negative 63.4° slope oblique upsampling technique used to generate an upsampled target pixel.
Figure 23A:
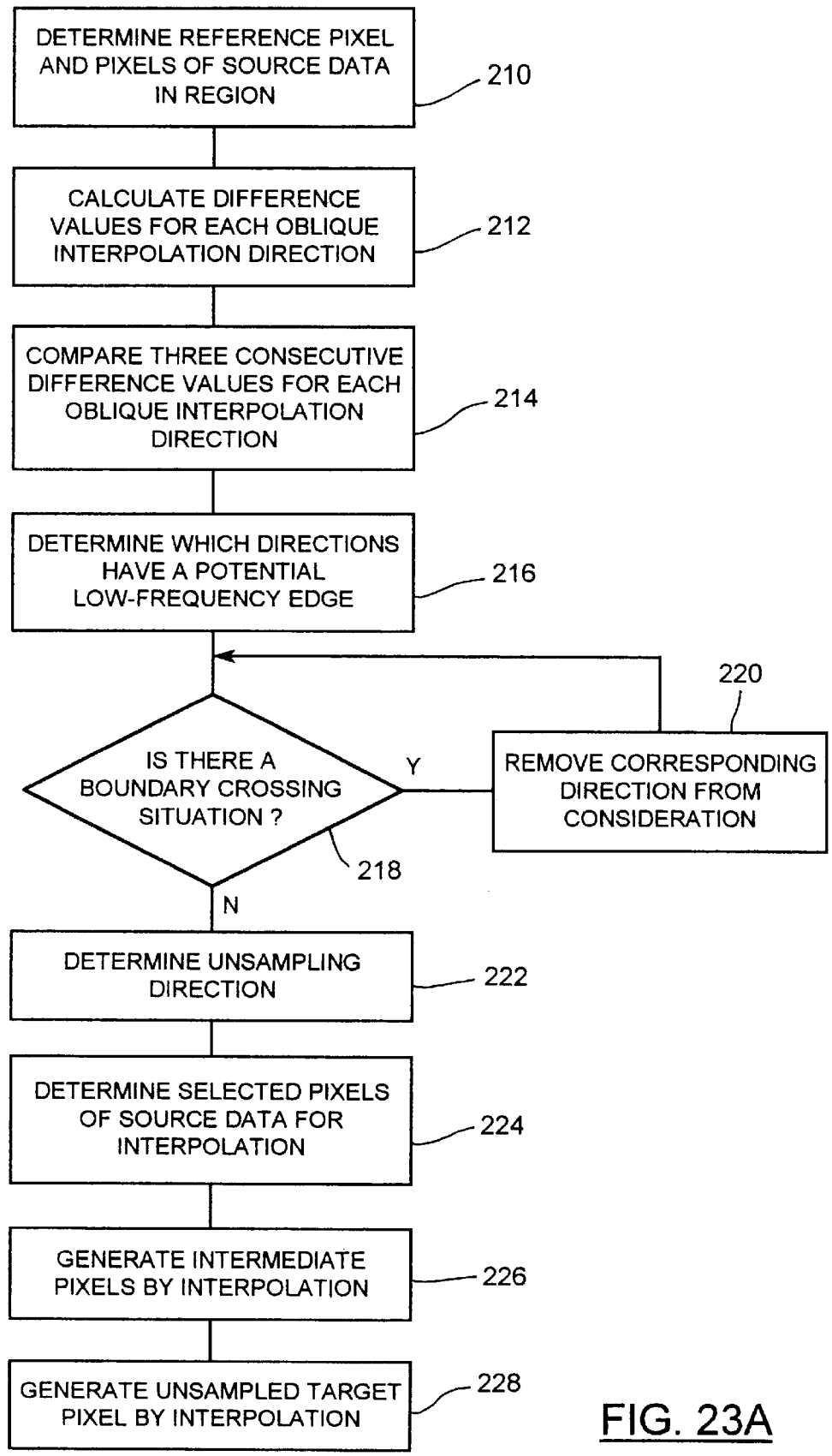
FIGS. 23a and 23b are flowcharts showing the steps performed in a second method when generating an upsampled target pixel from the source data.
Figure 23B:
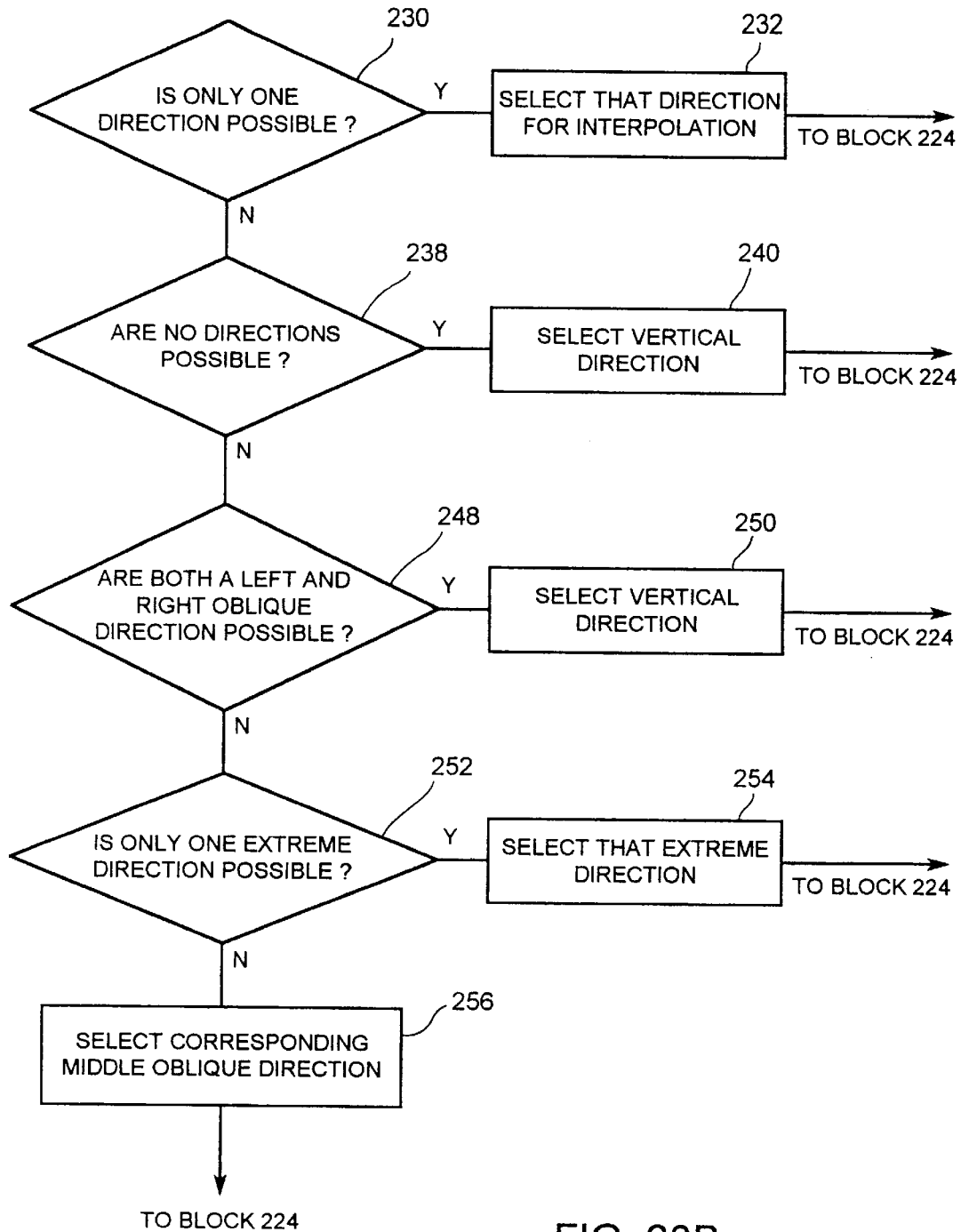

For the oblique up-up-left $O_{UUL}$, interpolation direction shown in FIG. 22 the upsampled target pixel w, is in the Top-Right quadrant with $\alpha_x$ positive and $\alpha_y$ negative. Interpolation is along the negatively sloped 63.4° diagonals. The linear upsampling parameter for the inside diagonal is $(1+\alpha_y)/2$ and the parameter for the outside diagonals is $-\alpha_y/2$. Once again using linear interpolation:

$v_0 = (1-0.5(1+\alpha_y))U_{-1-1} + 0.5(1+\alpha_y)U_{10}$ $v_1 = (1-0.5(-\alpha_y))U_{00} + 0.5(-\alpha_y)U_{-2-1}$ $v_2 = (1-0.5(1+\alpha_y))U_{-10} + 0.5(1-\alpha_y)U_{11}$ $v_3 = (1-0.5(-\alpha_y))U_{01} + 0.5(\alpha_y)U_{-20}$ $v_4 = (1-0.5(1-\alpha_y))U_{-11} + 0.5(1-\alpha_y)U_{12}$ Four-point horizontal interpolation is performed on the intermediate pixels. Orne again the horizontal distances to the intermediate pixels are half the vertical distances, and $\beta$ is twice the distance from the centre intermediate pixel to the target pixel. For the case of he upsampled target pixel w being in the Top-Right quadrant, $\beta = 2(\alpha_x + (-0.5\alpha_a) - 1) = -1 + 2\alpha_x - \alpha_y$. Since $\beta$ is positive, the upsampled target pixel is represented by:

$w = f(v_1, v_2, v_3, v_4, \beta)$

A similar method applies for the other quadrants. FIG. 22 shows the calculation of $\beta$ for other quadrants as summarized in Table A.

Figure 24:
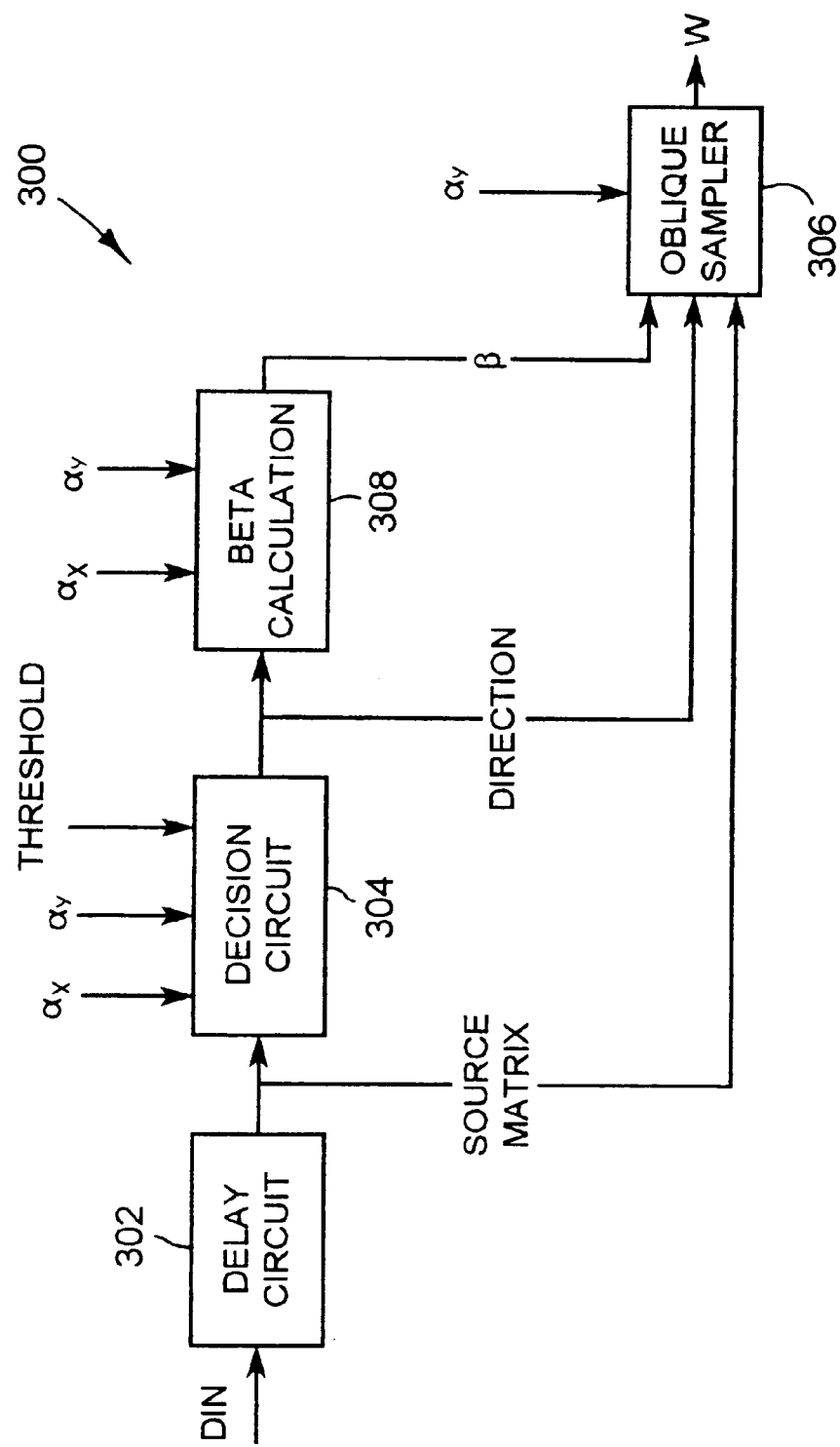
FIG. 24 is a block diagram showing a second apparatus for generating upsampled target pixels from input source data.

FIG. 24 shows a basic source data interpolation apparatus 300 for performing the above method. As can be seen, apparatus 300 is the same as the apparatus used in the first embodiment. The same block diagram applies to the second embodiment just described. Source data $D_{in}$ is passed through a delay circuit 302 which extracts the necessary source pixels required for interpolation. These source pixels are used by the decision circuit 304 to select an interpolation direction. The selected interpolation direction is passed to the $\beta$ calculator 308 to determine the value of $\beta$. The source pixels, interpolation direction, and $\beta$ are all passed to the oblique upsampler 306 for directional interpolation to generate the upsampled target pixel w.

Figure 25:
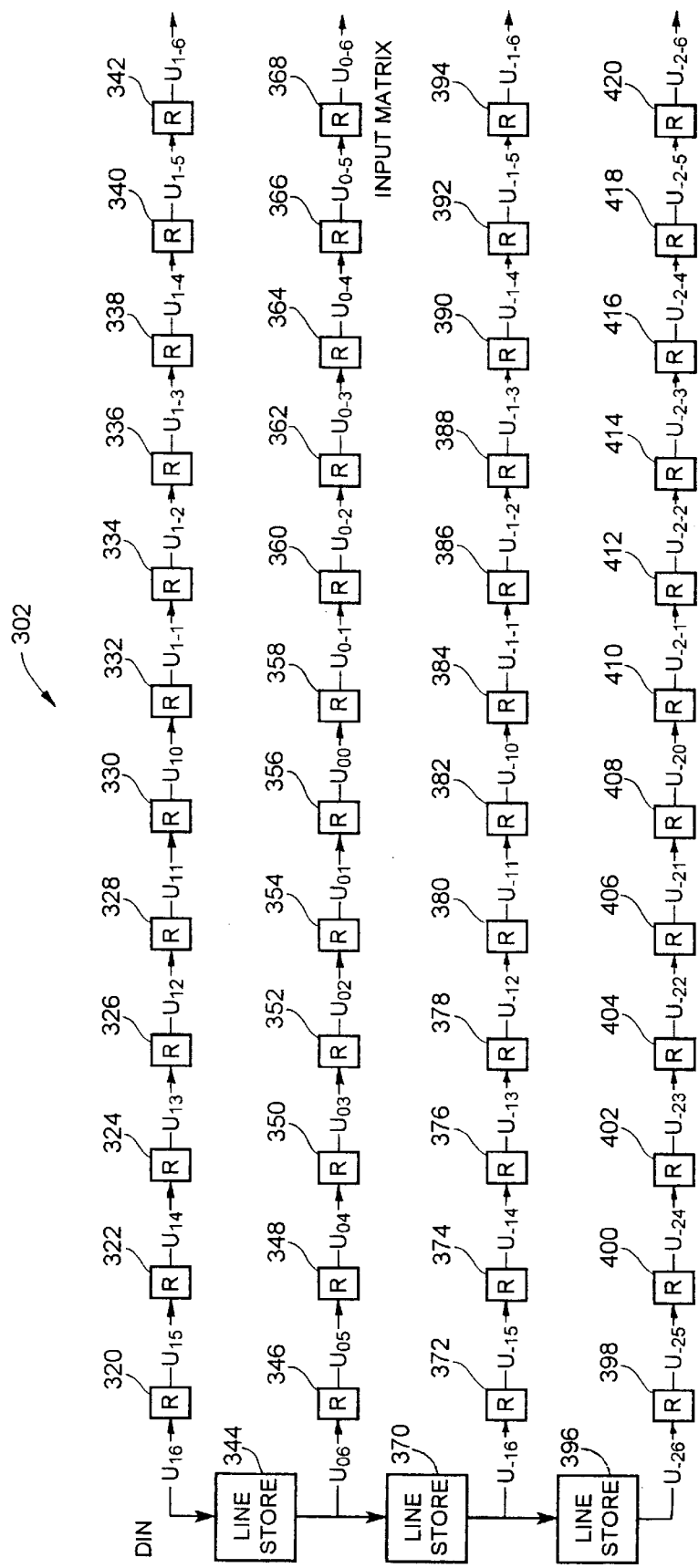
FIG. 25 is a schematic of a delay circuit forming part of the apparatus illustrated in FIG. 24.

FIG. 25 better illustrates the delay circuit 302 of the present embodiment. It includes three line stores 344, 370, and 396 which give access to four consecutive source lines and forty-eight delay elements 320 to 342, 346 to 368, 372 to 394, and 398 to 420 "which in turn"; and give access to thirteen adjacent source pixels on each of the four source lines. The delay circuit extracts the 13x4 source matrix needed for interpolation. When interpolating in the upper quadrants, the pixels extracted correspond to the source pixels labelled.

Figure 26:
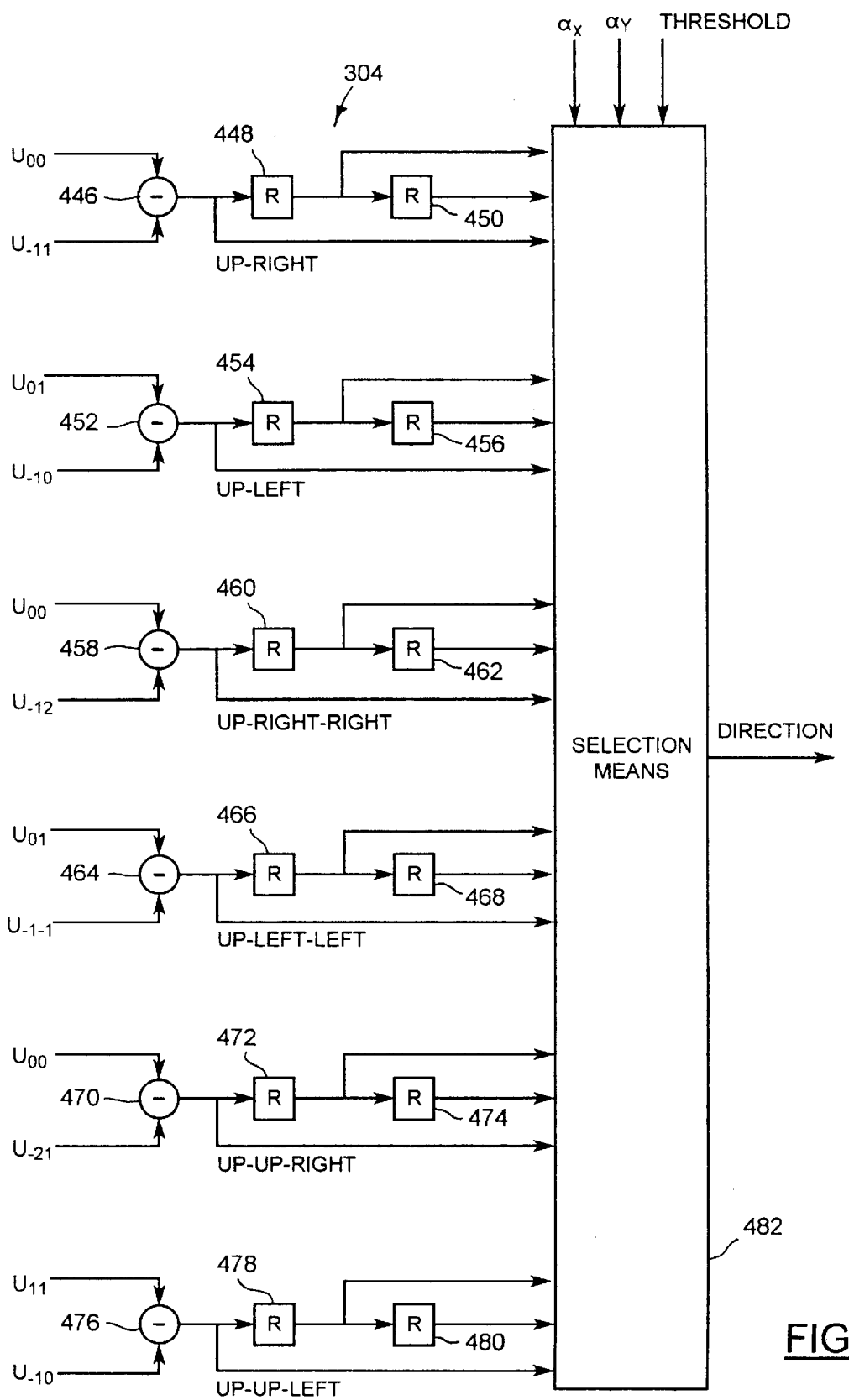
FIG. 26 is a schematic of a decision circuit forming part of the apparatus illustrated in FIG. 24.

The decision circuit 304 is better illustrated in FIG. 26. Input source pixels are fed to six subtractors 446, 452, 458, 464, 470, and 476. Each subtractor calculates a difference value corresponding to one of the six possible oblique directions. Two delay elements for each difference value 448, 450, 454, 456, 460, 462, 466, 468, 472, 474, 478, and 480 provide access to three consecutive difference values for each direction. These difference values are passed to a selection means 482 which selects either one of the six possible oblique interpolation directions or the vertical interpolation direction. The source pixels labelled correspond to interpolation in the top-left quadrant.

Figure 27:
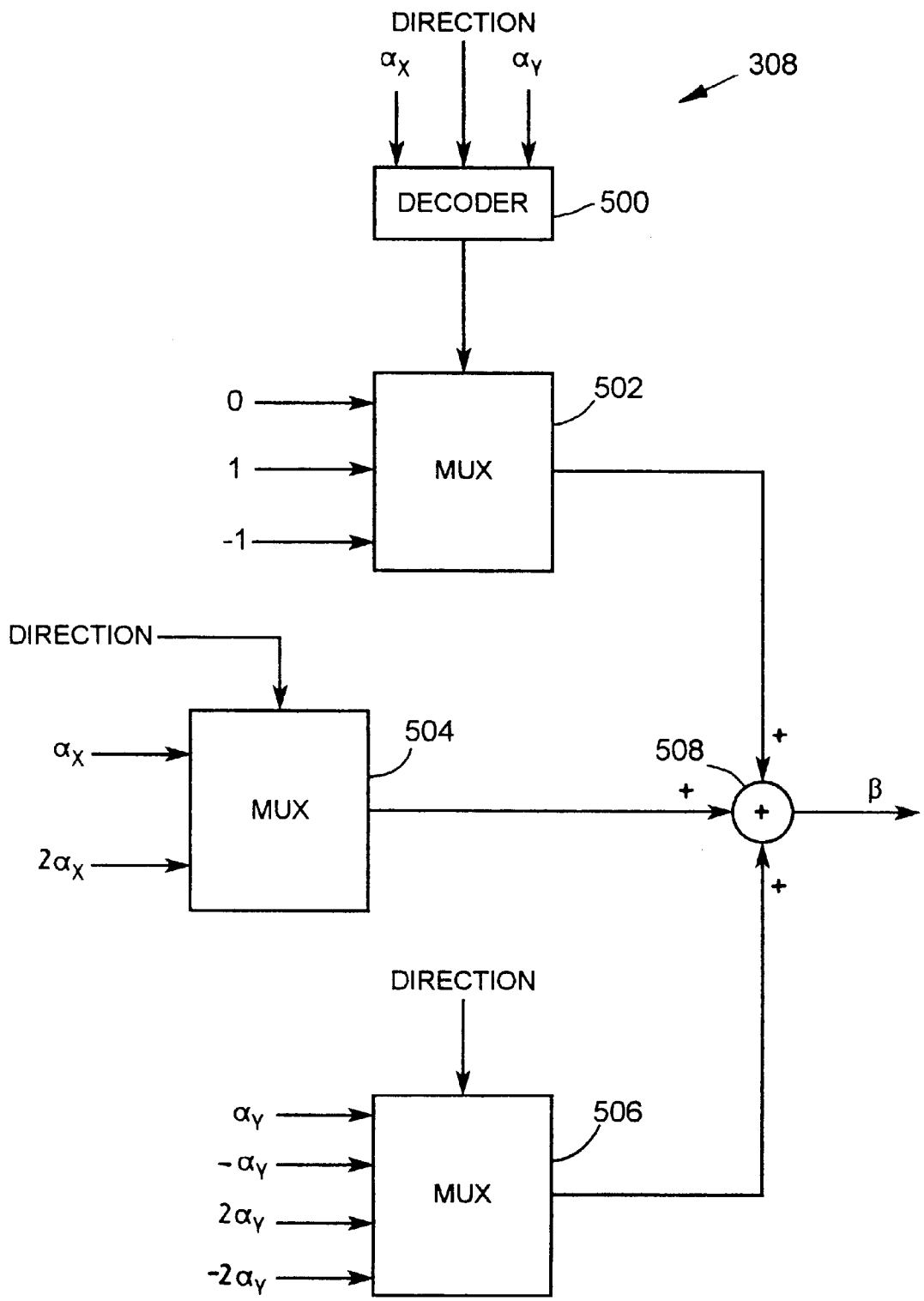
FIG. 27 is a schematic of a $\beta$ calculator forming part of the apparatus illustrated in FIG. 24.

The β calculator shown in FIG. 27 comprises a three input adder 508. The adder inputs are the outputs of three multiplexers 502, 504, and 506. The output of multiplexer 502 is 0, 1, or −1 depending on the output of decoder 500 which takes the interpolation direction selected and the quadrant of the upsampled target pixel. Multiplexer 504 outputs either $\alpha_x$ or $2\alpha_x$ depending on the interpolation direction selected. Finally multiplexer 506 outputs either $\alpha_y - \alpha_y$, $2\alpha_y$, or $-2\alpha_y$, depending also on the interpolation direction. The output of adder 508 is β.

Figure 28:
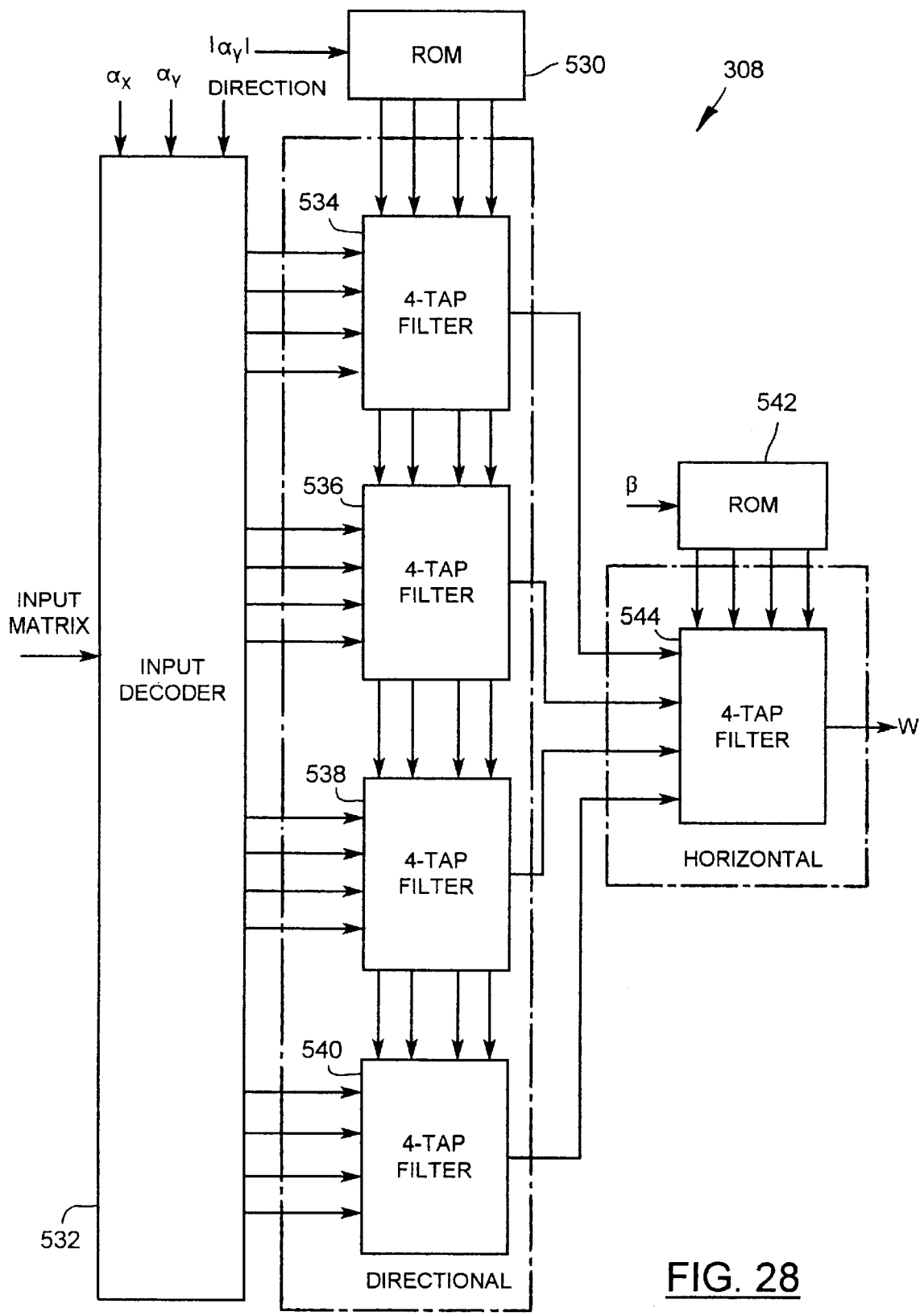
FIG. 28 is a schematic of an oblique upsampler forming part of the apparatus illustrated in FIG. 24.

The oblique upsampler 306 is best illustrated in FIG. 28. It comprises three main parts; namely an input decoder 532, a directional interpolator 306a and a horizontal interpolator 306b. The input source pixels are decoded in the input decoder 532 according to the quadrant in which the upsampled target pixel is located and the interpolation direction. The required source pixels are sent to the directional interpolator 306a which performs four 4-point interpolations to generate four intermediate pixels. The 4-point directional interpolation is performed by four 4-tap filters 534, 536, 538, and 540 whose coefficients are supplied from a ROM, 530, addressed by $|\alpha_y|$. The four intermediate pixels are passed to the 4-point horizontal interpolator 306b to calculate the upsampled target pixel w. The horizontal interpolator 306b is composed of a 4-tap filter 544 and a ROM, 542, addressed by β.

Table A below outlines the directional interpolations performed to generate the intermediate pixels for each of the seven interpolation directions. The Table also includes the formula for calculating β for the various directions and quadrants.

TABLE A

| Interpolation Direction | Quadrant | Intermediate Pixels $v_0, v_1, v_2, v_3, v_4$ | β |
|---|---|---|---|
| Vertical V | Top-Left $\alpha_x < 0$, $\alpha_y < 0$ | $v_0 = f(U_{1-2}, U_{0-2}, U_{-1-2}, U_{-2-2}, -\alpha_y)$<br>$v_1 = f(U_{1-1}, U_{0-1}, U_{-1-1}, U_{-2-1}, -\alpha_y)$<br>$v_2 = f(U_{10}, U_{00}, U_{-10}, U_{-20}, -\alpha_y)$<br>$v_3 = f(U_{11}, U_{01}, U_{-11}, U_{-21}, -\alpha_y)$<br>$v_4 = f(U_{12}, U_{02}, U_{-12}, U_{-22}, -\alpha_y)$ | $\alpha_x$<br><br><br><br>$\alpha_x$ |
| | Top-Right $\alpha_x \geq 0$, $\alpha_y < 0$ | $v_0 = f(U_{1-2}, U_{0-2}, U_{-1-2}, U_{-2-2}, -\alpha_y)$<br>$v_1 = f(U_{1-1}, U_{0-1}, U_{-1-1}, U_{-2-1}, -\alpha_y)$<br>$v_2 = f(U_{10}, U_{00}, U_{-10}, U_{-20}, -\alpha_y)$<br>$v_3 = f(U_{11}, U_{01}, U_{-11}, U_{-21}, -\alpha_y)$<br>$v_4 = f(U_{12}, U_{02}, U_{-12}, U_{-22}, -\alpha_y)$ | $\alpha_x$ |
| | Bottom-Left $\alpha_x < 0$, $\alpha_y \geq 0$ | $v_0 = f(U_{1-2}, U_{0-2}, U_{-1-2}, U_{2-2}, \alpha_y)$<br>$v_1 = f(U_{1-1}, U_{0-1}, U_{1-1}, U_{2-1}, \alpha_y)$<br>$v_2 = f(U_{10}, U_{00}, U_{10}, U_{20}, \alpha_y)$<br>$v_3 = f(U_{11}, U_{01}, U_{11}, U_{21}, \alpha_y)$<br>$v_4 = f(U_{12}, U_{02}, U_{12}, U_{22}, \alpha_y)$ | $\alpha_x$ |
| | Bottom-Right $\alpha_x \geq 0$, $\alpha_y \geq 0$ | $v_0 = f(U_{1-2}, U_{0-2}, U_{1-2}, U_{2-2}, \alpha_y)$<br>$v_1 = f(U_{1-1}, U_{0-1}, U_{1-1}, U_{2-1}, \alpha_y)$<br>$v_2 = f(U_{10}, U_{00}, U_{10}, U_{20}, \alpha_y)$<br>$v_3 = f(U_{11}, U_{01}, U_{11}, U_{21}, \alpha_y)$<br>$v_4 = f(U_{12}, U_{02}, U_{12}, U_{22}, \alpha_y)$ | |
| Up-Right $O_{UR}$ | Top-Left $\alpha_x < 0$, $\alpha_y < 0$ | $v_0 = f(U_{1-4}, U_{0-3}, U_{-1-2}, U_{-2-1}, -\alpha_y)$<br>$v_1 = f(U_{1-3}, U_{0-2}, U_{-1-1}, U_{-20}, -\alpha_y)$<br>$v_2 = f(U_{1-2}, U_{0-1}, U_{-10}, U_{-21}, -\alpha_y)$<br>$v_3 = f(U_{1-1}, U_{00}, U_{-11}, U_{-22}, -\alpha_y)$<br>$v_4 = f(U_{10}, U_{01}, U_{-12}, U_{-23}, -\alpha_y)$ | $1 + \alpha_x$<br>$+ \alpha_y$<br><br><br>$\alpha_x + \alpha_y$ |
| | Top-Right $\alpha_x \geq 0$, $\alpha_y < 0$ | $v_0 = f(U_{1-3}, U_{0-2}, U_{-1-1}, U_{-20}, -\alpha_y)$<br>$v_1 = f(U_{1-2}, U_{0-1}, U_{-10}, U_{-21}, -\alpha_y)$<br>$v_2 = f(U_{1-1}, U_{00}, U_{-11}, U_{-22}, -\alpha_y)$<br>$v_3 = f(U_{10}, U_{01}, U_{-12}, U_{-23}, -\alpha_y)$<br>$v_4 = f(U_{11}, U_{02}, U_{-13}, U_{-24}, -\alpha_y)$ | $\alpha_x + \alpha_y$ |
| | Bottom-Left $\alpha_x < 0$,  | $v_0 = f(U_{-1-1}, U_{0-2}, U_{1-3}, U_{2-4}, \alpha_y)$<br>$v_1 = f(U_{-10}, U_{0-1}, U_{1-2}, U_{2-3}, \alpha_y)$<br>$v_2 = f(U_{-11}, U_{00}, U_{1-1}, U_{2-2}, \alpha_y)$ | $1 + \alpha_x$ |

TABLE A-continued

| Interpolation Direction | Quadrant | Intermediate Pixels $v_0, v_1, v_2, v_3, v_4$ | β |
|---|---|---|---|
| | $\alpha_y \geq 0$ | $v_3 = f(U_{-12}, U_{01}, U_{10}, U_{2-1}, \alpha_y)$<br>$v_4 = f(U_{-13}, U_{02}, U_{11}, U_{20}, \alpha_y)$ | $+ \alpha_y$ |
| | Bottom-Right $\alpha_x \geq 0$, $\alpha_y \geq 0$ | $v_0 = f(U_{-10}, U_{0-1}, U_{1-2}, U_{2-3}, \alpha_y)$<br>$v_1 = f(U_{-11}, U_{00}, U_{1-1}, U_{2-2}, \alpha_y)$<br>$v_2 = f(U_{-12}, U_{01}, U_{10}, U_{2-1}, \alpha_y)$<br>$v_3 = f(U_{-13}, U_{02}, U_{11}, U_{20}, \alpha_y)$<br>$v_4 = f(U_{-14}, U_{03}, U_{12}, U_{21}, \alpha_y)$ | |
| Up-Left $O_{UL}$ | Top-Left $\alpha_x < 0$, $\alpha_y < 0$ | $v_0 = f(U_{1-1}, U_{0-2}, U_{-1-3}, U_{-2-4}, -\alpha_y)$<br>$v_1 = f(U_{10}, U_{0-1}, U_{-1-2}, U_{-2-3}, -\alpha_y)$<br>$v_2 = f(U_{11}, U_{00}, U_{-1-1}, U_{-2-2}, -\alpha_y)$<br>$v_3 = f(U_{12}, U_{01}, U_{-10}, U_{-2-1}, -\alpha_y)$<br>$v_4 = f(U_{13}, U_{02}, U_{-11}, U_{-20}, -\alpha_y)$ | $\alpha_x - \alpha_y$<br><br><br><br>$-1 + \alpha_x$<br>$- \alpha_y$ |
| | Top-Right $\alpha_x \geq 0$, $\alpha_y < 0$ | $v_0 = f(U_{10}, U_{0-1}, U_{-1-2}, U_{-2-3}, -\alpha_y)$<br>$v_1 = f(U_{11}, U_{00}, U_{-1-1}, U_{-2-2}, -\alpha_y)$<br>$v_2 = f(U_{12}, U_{01}, U_{-10}, U_{-2-1}, -\alpha_y)$<br>$v_3 = f(U_{13}, U_{02}, U_{-11}, U_{-20}, -\alpha_y)$<br>$v_4 = f(U_{14}, U_{03}, U_{-12}, U_{-21}, -\alpha_y)$ | $1 + \alpha_x$<br>$- \alpha_y$ |
| | Bottom Left $\alpha_x < 0$, $\alpha_y \geq 0$ | $v_0 = f(U_{-1-4}, U_{0-3}, U_{1-2}, U_{2-1}, \alpha_y)$<br>$v_1 = f(U_{-1-3}, U_{0-2}, U_{1-1}, U_{20}, \alpha_y)$<br>$v_2 = f(U_{-1-2}, U_{0-1}, U_{10}, U_{21}, \alpha_y)$<br>$v_3 = f(U_{-1-1}, U_{00}, U_{11}, U_{22}, \alpha_y)$<br>$v_4 = f(U_{-10}, U_{01}, U_{12}, U_{23}, \alpha_y)$ | $\alpha_x - \alpha_y$ |
| | Bottom-Right $\alpha_x \geq 0$, $\alpha_y \geq 0$ | $v_0 = f(U_{-1-3}, U_{0-2}, U_{1-1}, U_{20}, \alpha_y)$<br>$v_1 = f(U_{-1-2}, U_{0-1}, U_{10}, U_{21}, \alpha_y)$<br>$v_2 = f(U_{-1-1}, U_{00}, U_{11}, U_{22}, \alpha_y)$<br>$v_3 = f(U_{-10}, U_{01}, U_{12}, U_{23}, \alpha_y)$<br>$v_4 = f(U_{11}, U_{02}, U_{13}, U_{24}, \alpha_y)$ | |
| Up-Right-Right $O_{URR}$ | Top-Left $\alpha_x < 0$, $\alpha_y < 0$ | $v_0 = f(U_{1-5}, U_{0-3}, U_{-1-1}, U_{-21}, -\alpha_y)$<br>$v_1 = f(U_{1-4}, U_{0-2}, U_{-10}, U_{-22}, -\alpha_y)$<br>$v_2 = f(U_{1-3}, U_{0-1}, U_{-11}, U_{-23}, -\alpha_y)$<br>$v_3 = f(U_{1-2}, U_{00}, U_{-12}, U_{-24}, -\alpha_y)$<br>$v_4 = f(U_{1-1}, U_{01}, U_{-13}, U_{-25}, -\alpha_y)$ | $1 + \alpha_x$<br>$+ 2\alpha_y$<br><br><br><br>$\alpha_x +$<br>$2\alpha_y$ |
| | Top-Right $\alpha_x \geq 0$, $\alpha_y < 0$ | $v_0 = f(U_{1-4}, U_{0-2}, U_{-10}, U_{-22}, -\alpha_y)$<br>$v_1 = f(U_{1-3}, U_{0-1}, U_{-11}, U_{-23}, -\alpha_y)$<br>$v_2 = f(U_{1-2}, U_{00}, U_{-12}, U_{-24}, -\alpha_y)$<br>$v_3 = f(U_{1-1}, U_{01}, U_{-13}, U_{-25}, -\alpha_y)$<br>$v_4 = f(U_{10}, U_{02}, U_{-14}, U_{-26}, -\alpha_y)$ | $\alpha_x +$<br>$2\alpha_y$ |
| | Bottom-Left $\alpha_x < 0$, $\alpha_y \geq 0$ | $v_0 = f(U_{-10}, U_{0-2}, U_{1-4}, U_{2-6}, \alpha_y)$<br>$v_1 = f(U_{-11}, U_{0-1}, U_{1-3}, U_{2-5}, \alpha_y)$<br>$v_2 = f(U_{-12}, U_{00}, U_{1-2}, U_{2-4}, \alpha_y)$<br>$v_3 = f(U_{-13}, U_{01}, U_{1-1}, U_{2-3}, \alpha_y)$<br>$v_4 = f(U_{-14}, U_{02}, U_{10}, U_{2-2}, \alpha_y)$ | $1 + \alpha_x$<br>$+ 2\alpha_y$ |
| | Bottom-Right $\alpha_x \geq 0$, $\alpha_y \geq 0$ | $v_0 = f(U_{-1-1}, U_{0-1}, U_{1-3}, U_{2-5}, \alpha_y)$<br>$v_1 = f(U_{-1-2}, U_{00}, U_{1-2}, U_{2-4}, \alpha_y)$<br>$v_2 = f(U_{-13}, U_{01}, U_{1-1}, U_{2-3}, \alpha_y)$<br>$v_3 = f(U_{-14}, U_{02}, U_{10}, U_{2-2}, \alpha_y)$<br>$v_4 = f(U_{-15}, U_{03}, U_{11}, U_{2-1}, \alpha_y)$ | |
| Up-Left-Left $O_{ULL}$ | Top-Left $\alpha_x < 0$, $\alpha_y < 0$ | $v_0 = f(U_{10}, U_{0-2}, U_{-1-4}, U_{-2-6}, -\alpha_y)$<br>$v_1 = f(U_{11}, U_{0-1}, U_{-1-3}, U_{-2-5}, -\alpha_y)$<br>$v_2 = f(U_{12}, U_{00}, U_{-1-2}, U_{-2-4}, -\alpha_y)$<br>$v_3 = f(U_{13}, U_{01}, U_{-1-1}, U_{-2-3}, -\alpha_y)$<br>$v_4 = f(U_{14}, U_{02}, U_{-10}, U_{-2-2}, -\alpha_y)$ | $\alpha_x - 2\alpha_y$<br><br><br><br>$-1 + \alpha_x$<br>$-2\alpha_y$ |
| | Top-Right $\alpha_x \geq 0$, $\alpha_y < 0$ | $v_0 = f(U_{11}, U_{0-1}, U_{-1-3}, U_{-2-5}, -\alpha_y)$<br>$v_1 = f(U_{12}, U_{00}, U_{-1-2}, U_{-2-4}, -\alpha_y)$<br>$v_2 = f(U_{13}, U_{01}, U_{-1-1}, U_{-2-3}, -\alpha_y)$<br>$v_3 = f(U_{14}, U_{02}, U_{-10}, U_{-2-2}, -\alpha_y)$<br>$v_4 = f(U_{15}, U_{03}, U_{-11}, U_{-2-1}, -\alpha_y)$ | $1 + \alpha_x$<br>$-2\alpha_y$ |
| | Bottom-Left $\alpha_x < 0$, $\alpha_y \geq 0$ | $v_0 = f(U_{-1-5}, U_{0-3}, U_{1-1}, U_{21}, \alpha_y)$<br>$v_1 = f(U_{-1-4}, U_{0-2}, U_{10}, U_{22}, \alpha_y)$<br>$v_2 = f(U_{-1-3}, U_{0-1}, U_{11}, U_{23}, \alpha_y)$<br>$v_3 = f(U_{-1-2}, U_{00}, U_{12}, U_{24}, \alpha_y)$<br>$v_4 = f(U_{-1-1}, U_{01}, U_{13}, U_{25}, \alpha_y)$ | $\alpha_x -$<br>$2\alpha_y$ |
| | Bottom-Right $\alpha_x \geq 0$, $\alpha_y \geq 0$ | $v_0 = f(U_{-1-4}, U_{0-2}, U_{10}, U_{22}, \alpha_y)$<br>$v_1 = f(U_{-1-3}, U_{0-1}, U_{11}, U_{23}, \alpha_y)$<br>$v_2 = f(U_{-1-2}, U_{00}, U_{12}, U_{24}, \alpha_y)$<br>$v_3 = f(U_{-1-1}, U_{01}, U_{13}, U_{25}, \alpha_y)$<br>$v_4 = f(U_{-10}, U_{02}, U_{14}, U_{26}, \alpha_y)$ | |
| Up-Up-Right $O_{UUR}$ | Top-Left $\alpha_x < 0$, $\alpha_y < 0$ | $v_0 = U_{-1-1} + (U_{1-2} - U_{-1-1})(0.5 + 0.5\alpha_y)$<br>$v_1 = U_{0-1} + (U_{-20} - U_{0-1})(-0.5\alpha_y)$<br>$v_2 = U_{-10} + (U_{1-1} - U_{-10})(0.5 + 0.5\alpha_y)$<br>$v_3 = U_{00} + (U_{-21} - U_{00})(-0.5\alpha_y)$<br>$v_4 = U_{-11} + (U_{10} - U_{-11})(0.5 + 0.5\alpha_y)$ | $1 + 2\alpha_x$<br>$+ \alpha_y$ |
| | Top-Right | $v_0 = U_{0-1} + (U_{-20} - U_{0-1})(-0.5\alpha_y)$<br>$v_1 = U_{-10} + (U_{1-1} - U_{-10})(0.5 + 0.5\alpha_y)$ | $2\alpha_x +$ |

TABLE A-continued

| Interpolation Direction | Quadrant | Intermediate Pixels $v_0, v_1, v_2, v_3, v_4$ | $\beta$ |
|---|---|---|---|
| | | $\alpha_x \geq 0,\ v_2 = U_{00} + (U_{-21} - U_{00})(-0.5\alpha_y)$ $\alpha_y < 0\ \ v_3 = U_{-11} + (U_{10} - U_{-11})(0.5 + 0.5\alpha_y)$ $v_4 = U_{01} + (U_{-22} - U_{01})(-0.5\alpha_y)$ | $\alpha_y$ |
| | Bottom-Left | $v_0 = U_{0-1} + (U_{2-2} - U_{0-1})(0.5\alpha_y)$ $v_1 = U_{1-1} + (U_{-10} - U_{1-1})(0.5 - 0.5\alpha_y)$ $\alpha_x < 0,\ v_2 = U_{00} + (U_{2-1} - U_{00})(0.5\alpha_y)$ $\alpha_y \geq 0\ \ v_3 = U_{10} + (U_{-11} - U_{10})(0.5 - 0.5\alpha_y)$ $v_4 = U_{01} + (U_{20} - U_{01})(0.5\alpha_y)$ | $2\alpha_x + \alpha_y$ |
| | Bottom-Right | $v_0 = U_{-1-1} + (U_{-10} - U_{-1-1})(0.5 - 0.5\alpha_y)$ $v_1 = U_{00} + (U_{2-1} - U_{00})(0.5\alpha_y)$ $\alpha_x \geq 0,\ v_2 = U_{10} + (U_{-11} - U_{10})(0.5 - 0.5\alpha_y)$ $\alpha_y \geq 0\ \ v_3 = U_{01} + (U_{20} - U_{01})(0.5\alpha_y)$ $v_4 = U_{11} + (U_{-12} - U_{11})(0.5 - 0.5\alpha_y)$ | $-1 +$ $2\alpha_x + \alpha_y$ |
| Up-Up Left $O_{UUL}$ | Top-Left | $v_0 = U_{0-1} + (U_{-2-2} - U_{0-1})(-0.5\alpha_y)$ $v_1 = U_{-1-1} + (U_{-10} - U_{-1-1})(0.5 + 0.5\alpha_y)$ $\alpha_x < 0,\ v_2 = U_{00} + (U_{-2-1} - U_{00})(-0.5\alpha_y)$ $\alpha_y < 0\ \ v_3 = U_{-10} + (U_{-11} - U_{-10})(0.5 + 0.5\alpha_y)$ $v_4 = U_{01} + (U_{-20} - U_{01})(-0.5\alpha_y)$ | $2\alpha_x - \alpha_y$ |
| | Top-Right | $v_0 = U_{-1-1} + (U_{-10} - U_{-1-1})(0.5 + 0.5\alpha_y)$ $v_1 = U_{00} + (U_{-2-1} - U_{00})(-0.5\alpha_y)$ $\alpha_x \geq 0,\ v_2 = U_{-10} + (U_{-11} - U_{-10})(0.5 + 0.5\alpha_y)$ $\alpha_y < 0\ \ v_3 = U_{01} + (U_{-20} - U_{01})(-0.5\alpha_y)$ $v_4 = U_{-11} + (U_{-12} - U_{-11})(0.5 + 0.5\alpha_y)$ | $-1 +$ $2\alpha_x - \alpha_y$ |
| | Bottom-Left | $v_0 = U_{1-1} + (U_{-1-2} - U_{1-1})(0.5 - 0.5\alpha_y)$ $v_1 = U_{0-1} + (U_{20} - U_{0-1})(0.5\alpha_y)$ $\alpha_x < 0,\ v_2 = U_{10} + (U_{-1-1} - U_{10})(0.5 - 0.5\alpha_y)$ $\alpha_y \geq 0\ \ v_3 = U_{00} + (U_{21} - U_{00})(0.5\alpha_y)$ $v_4 = U_{1-1} + (U_{-10} - U_{1-1})(0.5 - 0.5\alpha_y)$ | $1 + 2\alpha_x$ $-\alpha_y$ |
| | Bottom-Right | $v_0 = U_{0-1} + (U_{20} - U_{0-1})(0.5\alpha_y)$ $v_1 = U_{10} + (U_{-1-1} - U_{10})(0.5 - 0.5\alpha_y)$ $\alpha_x \geq 0,\ v_2 = U_{00} + (U_{21} - U_{00})(0.5\alpha_y)$ $\alpha_y \geq 0\ \ v_3 = U_{1-1} + (U_{-10} - U_{1-1})(0.5 - 0.5\alpha_y)$ $v_4 = U_{01} + (U_{22} - U_{01})(0.5\alpha_y)$ | $2\alpha_x - \alpha_y$ |

As mentioned previously, Once the intermediate pixels are generated four-point horizontal interpolation is performed on the intermediate pixels to generate the desired upsampled target pixel w.

$w = f(v_1, v_2, v_3, v_4, \beta)\ \ \beta \geq 0$ $w = f(v_3, v_2, v_1, v_0, -\beta)\ \ \beta < 0$ The present methods and apparatuses allow upsampled target pixels to be generated so that when an image of the source data is to be enlarged and recreated, the resolution of the enlarged image is high and stairstepping is minimized.

As should be apparent to those of skill in the art, various modifications may be made to the present invention without departing from its scope as defined by the appended claims. For example, although two embodiments of the invention have been described herein, it should be apparent that other embodiments are possible and that the number of oblique directions in each set can be chosen arbitrarily.

We claim:

1. A method of generating an upsampled target pixel from input source data, comprising:
   (i) comparing pixels of different lines of said source data in a region surrounding an upsampled target pixel to be generated in at least two different directions;
   (ii) selecting an interpolation direction based on the comparing;
   (iii) interpolating between selected pixels of different lines of said source data in the interpolation direction and computing intermediate pixels on opposite sides of and on a line segment passing through said upsampled target pixel to be generated, said line segment being parallel to said lines of source data; and
   (iv) interpolating between the intermediate pixels to generate said upsampled target pixel.

2. The method of claim 1, wherein, in said comparing, the pixels of different lines of said source data are compared in at least three different directions.

3. The method of claim 2, wherein, in said comparing, pixels of different lines of said source data are compared in only three different directions, said three different directions including a vertical direction, and opposite oblique directions forming angles with said vertical direction, each said angle being in the range 0<angle<90°, the pixels of said source data that are compared in each of said oblique directions being located on opposite sides of said upsampled target pixel to be generated.

4. The method of claim 3, wherein during the comparing, difference values between the compared pixels are generated, the difference values being used at the selecting to select the interpolation direction.

5. The method of claim 4, wherein prior to the selecting, the difference values resulting from the comparisons in said three directions are compared to determine whether the differences therebetween are within a threshold, the interpolation direction associated with the smallest difference value being selected when none of the differences are within the threshold, the selection of said interpolation direction being influenced when the difference between at least two difference values is within the threshold.

6. The method of claim 5, wherein when the differences between the difference values resulting from the comparisons in all three directions are within said threshold, the vertical interpolation direction is selected.

7. The method of claim 6, wherein when the difference between the difference values resulting from the comparisons in the vertical direction and only one of the oblique directions is within the threshold, that oblique interpolation direction is selected.

8. The method of claim 7, wherein when the difference between the difference values resulting from the comparisons in the two oblique directions is within the threshold, additional pixels of the different lines of source data are compared in the opposite oblique directions, the pixels of said source data that are compared in each of said oblique directions being located on opposite sides of said upsampled target pixel to be generated, the difference values generated as a result of these comparisons being compared to influence the selection of said interpolation direction.

9. The method of claim 8, wherein when the difference between the difference values resulting from the comparisons of the additional pixels is within the threshold, the vertical interpolation direction is selected.

10. The method of claim 3, wherein during the selecting, the pixels of the different lines of source data are examined to determine the closest pixel to said upsampled target pixel and wherein said region is defined by consecutive pixels in two lines of source data that form the corners of a rectangular region surrounding said upsampled target pixel, one of the pixels of which is said closest pixel, said oblique directions forming a 45° angle with said vertical direction and constituting diagonals of said rectangular region.

11. The method of claim 10, wherein during the comparing, difference values between the compared pixels are generated, the difference values being used at the selecting to select the interpolation direction.

12. The method of claim 11, wherein prior to the selecting, the difference values resulting from the comparisons in said three directions are compared to determine whether the differences therebetween are within a threshold, the interpolation direction associated with the smallest difference value being selected when none of the differences are within the threshold, the selection of said interpolation direction being influenced when the difference between at least two difference values is within the threshold.

13. The method of claim 12, wherein at the selecting, when the differences between the difference values resulting from the comparisons in all three interpolation directions are within said threshold, the vertical interpolation direction is selected.

14. The method of claim 13, wherein when the difference between the difference values resulting from the comparisons in the vertical direction and only one of the oblique directions is within the threshold, that oblique interpolation direction is selected.

15. The method of claim 14, wherein when the difference between the difference values resulting from the comparisons in the two oblique directions is within the threshold, additional pixels of the different lines of source data are compared in the opposite oblique directions, the difference values generated as a result of these comparisons being compared to influence the selection of said interpolation direction.

16. The method of claim 15, wherein the difference between the difference values resulting from the comparisons of the additional pixels is within the threshold, the vertical interpolation direction is selected.

17. The method of claim 2, wherein at the comparing, pixels of different lines of said source data are compared in at least seven different directions.

18. The method of claim 17, wherein, in said comparing, pixels of different lines of said source data are compared in only seven different directions, said seven different directions including a vertical direction, and two sets of opposite oblique directions forming angles with said vertical direction, each said angle being in the range of 0<angle<90°, each set of opposite oblique directions including three oblique directions, each oblique direction forming a different angle with said vertical direction, the pixels of the source data that are compared in each set of oblique directions, being located on opposite sides of said upsampled target pixel to be generated.

19. The method of claim 18, wherein one of the oblique directions in each set forms a 26.6° angle with the vertical direction, another of the oblique direction in each set forms a 63.4° angle with the vertical direction and another of the oblique directions in each set forms a 45° angle with said vertical direction.

20. The method of claim 19, wherein during the comparisons of the comparing, difference values between the compared pixels are generated, the difference values being used to select the interpolation direction.

21. The method of claim 20, wherein the difference values generated during comparisons in said oblique directions in each set are summed to yield a working difference value, the working difference values and the difference value associated with said vertical direction being compared to determine whether the differences therebetween are within a threshold, the interpolation directions associated with the difference values within the threshold yielding a set of possible interpolation directions, the interpolation directions in said set being initially examined to eliminate interpolation directions which interpolate between pixels in a direction that cross a boundary, the remaining interpolation directions being compared further to select said interpolation direction.

22. The method of claim 21, wherein after interpolation directions which cross a boundary have been eliminated, at the selecting if only one oblique interpolation direction remains in said set then that interpolation direction is selected, if opposite oblique interpolation directions remain in said set then said vertical interpolation is selected and if more than one oblique interpolation direction in the same direction exists in the set then the 45° oblique interpolation direction is selected.

23. The method of claim 22, wherein at the interpolating between selected pixels interpolations between selected pixels on four different lines of said source data are made in the selected interpolation direction to yield five intermediate pixels.

24. An apparatus for generating an upsampled target pixel from input source data, comprising:
    comparison means for comparing pixels of different lines of said source data in a region surrounding an upsampled target pixel to be generated, in at least two different directions;
    selection means for selecting an interpolation direction in response to said comparison means; and
    upsampling means for interpolating between selected pixels of different lines of said source data in the interpolation direction selected by said selection means to compute intermediate pixels on opposite sides of and on a line segment passing through said upsampled target pixel to be generated, said line segment being parallel to said lines of source data and for interpolating between the intermediate pixels to generate said upsampled target pixel.

25. An apparatus as defined in claim 24, wherein said comparison means compares the pixels of different lines of said source data in a vertical direction and in opposite oblique directions forming angles with said vertical direction, each said angle being in the range 0<angle<90°.

26. An apparatus as defined in claim 25, wherein said comparison means generates a difference value for each of said three comparisons and wherein said selection means compares the difference values with one another to determine whether the differences therebetween are within a threshold, said selection means selecting the interpolation direction associated with the smallest difference value when none of the differences are within the threshold.

27. An apparatus as defined in claim 26, wherein said selection means selects the vertical interpolation direction when the differences between the all of the difference values are within said threshold.

28. An apparatus as defined in claim 27, wherein when the difference between the difference values in the vertical direction and only one of the oblique directions is within the threshold, the selection means selects that oblique interpolation.

29. An apparatus as defined in claim 28, wherein when the difference between the difference values in the two oblique directions is within the threshold, additional pixels of the different lines of source data are compared in the opposite oblique directions by the comparison means, the difference values generated as a result of these comparisons being compared by said selection means, when the difference between the difference values generated by the selection means as a result of the comparison of the additional pixels is within the threshold, the vertical interpolation direction is selected by said selection means.

30. An apparatus as defined in claim 26, further comprising means to determine the closest pixel of said source data to said unsampled target pixel and the consecutive pixels in two lines of said source data that form the corners of a rectangular region surrounding said upsampled target pixel, one of the pixels of which is said closest pixel, said comparison means being responsive to said determination means and comparing between the pixels that define said rectangular region.

31. An apparatus as defined in claim 24, wherein said comparison means compares pixels of different lines of said source data in at least three different directions.

32. An apparatus as defined in claim 31, wherein said comparison means compares pixels of different lines of said source data in at least seven different directions.

33. An apparatus as defined in claim 32, wherein said comparison means compares pixels of different lines of said source data in seven different directions, said seven different directions including a vertical direction and two sets of opposite oblique directions forming angles with said vertical direction, each set of opposite oblique directions including three oblique directions, each of said three oblique directions forming a different angle with said vertical direction, the compared pixels in each set of three oblique directions being located on opposite sides of said upsampled target pixel.

34. An apparatus as defined in claim 33, wherein said comparison means compares pixels in oblique directions forming 26.6°, 45° and 63.4° angles with said vertical direction.

35. An apparatus as defined in claim 24, wherein said upsampling means includes a directional interpolator for computing said intermediate pixels and a second interpolator for computing said upsampled target pixel.

36. An apparatus as defined in claim 35, wherein each of said linear interpolators includes a pair of adders and a multiplier.

37. An apparatus as defined in claim 33, wherein said comparison means includes a plurality of substractors, each substractor being associated with one of said oblique directions.

38. An apparatus as defined in claim 35, wherein said upsampling means includes a pair of linear interpolators for computing said intermediate pixels and a third linear interpolation for computing said upsampled target pixel.

39. An apparatus as defined in claim 38, wherein said directional interpolator includes a plurality of polyphase filters, each of said polyphase filters receiving coefficients from a memory.

40. An apparatus as defined in claim 39, wherein said second interpolator includes a polyphase filter receiving coefficients from a second memory.

41. An apparatus as defined in claim 34, wherein said comparison means generates a difference value for each of said seven comparisons, the difference values for said oblique directions in each set being summed to yield a working difference value.

42. An apparatus as defined in claim 41, wherein said selection means compares the working difference values and the difference value associated with the vertical direction with one another to determine whether the differences therebetween are within a threshold, said selection means selecting a set of possible interpolation directions associated with the smallest difference value when none of the differences are within the threshold, the interpolation directions in said set being initially examined to eliminate interpolation directions which interpolate between pixels in a direction that crosses a boundary.

43. An apparatus as defined in claim 42, wherein said selection means selects the vertical interpolation direction when opposite oblique interpolation directions remain in the set of possible interpolation directions.

44. An apparatus as defined in claim 43, wherein if only one oblique interpolation direction remains in the set of possible interpolation directions, the selection means selects that oblique interpolation direction.

45. An apparatus for generating an upsampled target pixel from input source data, comprising:

a comparator comparing pixels of different lines of said source data in a region surrounding an upsampled target pixel to be generated, in at least two different directions;

a selector selecting an interpolation direction in response to said comparator; and an upsampler interpolating between selected pixels of different lines of said source data in the interpolation direction selected by said selector to compute intermediate pixels on opposite sides of and on a line segment passing through said upsampled target pixel to be generated, said line segment being parallel to said lines of source data and interpolating between the intermediate pixels to generate said upsampled target pixel.

* * * * *